US006868424B2

(12) United States Patent
Jones et al.

(10) Patent No.: US 6,868,424 B2
(45) Date of Patent: Mar. 15, 2005

(54) ELECTRONIC FILING SYSTEM WITH FILE-PLACEHOLDERS

(75) Inventors: Rachel Jones, Cambridge (GB); Allan MacLean, Cambridge (GB); Richard Bentley, Cambridge (GB); Kevin Palfreyman, Cambridge (GB); James E. Pycock, St. Ives (GB); Jon O'Brien, Cambridge (GB); Graham Button, Huntingdon (GB)

(73) Assignee: Xerox Corporation, Stamford, CT (US)

(*) Notice: Subject to any disclaimer, the term of this patent is extended or adjusted under 35 U.S.C. 154(b) by 421 days.

(21) Appl. No.: 10/202,043

(22) Filed: Jul. 25, 2002

(65) Prior Publication Data

US 2004/0019613 A1 Jan. 29, 2004

(51) Int. Cl.[7] .............................................. G06F 17/30
(52) U.S. Cl. ....................................... 707/102; 707/205
(58) Field of Search .................................. 707/200, 205, 707/206, 102

(56) References Cited

U.S. PATENT DOCUMENTS

| | | | | |
|---|---|---|---|---|
| 5,832,522 A | * | 11/1998 | Blickenstaff et al. | 707/204 |
| 5,930,801 A | | 7/1999 | Falkenhainer et al. | 707/103 R |
| 6,240,429 B1 | | 5/2001 | Thornton et al. | 715/500 |
| 6,253,217 B1 | | 6/2001 | Dourish et al. | 715/500 |
| 6,266,670 B1 | | 7/2001 | LaMarca et al. | 707/707 |
| 6,266,682 B1 | | 7/2001 | LaMarca et al. | 715/501.1 |
| 6,269,380 B1 | | 7/2001 | Terry et al. | 707/200 |
| 6,308,179 B1 | | 10/2001 | Petersen et al. | 707/102 |
| 6,324,551 B1 | | 11/2001 | Lamping et al. | 715/500 |
| 6,778,989 B2 | * | 8/2004 | Bates et al. | 707/10 |
| 6,782,387 B1 | * | 8/2004 | Kumashio | 707/10 |
| 6,810,404 B1 | * | 10/2004 | Ferguson et al. | 707/200 |

FOREIGN PATENT DOCUMENTS

EP    0 986 009 A2    3/2000

OTHER PUBLICATIONS

Hefetz et al., Selectively Interpreted Portal Page Layout Template, U.S. Appl. No. 2004/0123238 A1, Jun. 24, 2004.*
U.S. Appl. No. 09/239,042, Entitled "Process Management System Wherein Process Descriptions Provide Indices To Document Histories".
U.S. Appl. No. 09/238,092, Entitled "Document Managment System For Recording And Viewing The History Of Document Use".
CenterWare DP, Network Printer Services for DocuPrint Network Printers, 1999.
CenterWare, Internet Services for DocuPrint Network Printers, 1999.
CenterWare Overview, pp. 1–6, 1999.
Flowport User Guide, Version 2.1, Nov. 2000 (see in particular Chapter 3).
"InConcert Data Sheet," by InConcert, Inc., 1998, originally published on the Internet at: http://www.inconcertsw.com/solution/datasheet.htm.

(List continued on next page.)

Primary Examiner—Greta Robinson
(74) Attorney, Agent, or Firm—Oliff & Berridge, PLC

(57) ABSTRACT

In an electronic document filing system, placeholder objects are used to provide an explicit representation of document files which are not yet present but which are explicitly expected by the system. A placeholder object can be a real filing system object, which may be processed by the filing system in the same manner as any other filing system object, and can include filing system data such as file metadata. The metadata may be associated with an expected source for the document file in, for example, filing systems, messaging systems, workflow systems, and document scanning systems.

20 Claims, 26 Drawing Sheets

OTHER PUBLICATIONS

Microsoft Outlook 2000 Help Page "Track when messages are delivered or read", 1999.

DocuShare 2.1 Quick Reference, 2000.

Using Xerox DocuShare 2.2, 2000 (see in particular Section 13, "PaperPort Link to DocuShare").

"White Paper: Object–Oriented Workflow Technology in InConcert," by InConcert, Inc., 1998, published on the Internet at http://www.inconcertsw.com/solution/sunil.htm.

* cited by examiner

Redeem Placeholder Response from Jon

Document: (required) [ ] Browse —66

Title: (required) [Response from Jon]

Summary: (required) [Jon's response to letter of 23 November 2001]

Max Versions: (required) [4]

Discription:

Keywords:

Restrict Write: ○ Yes ⦿ No

Author:

[Redeem]—68    [Redeem Draft]---74

FIG. 7

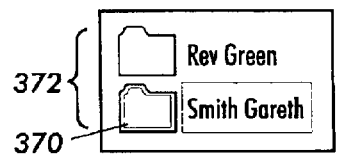
FIG. 31(a)
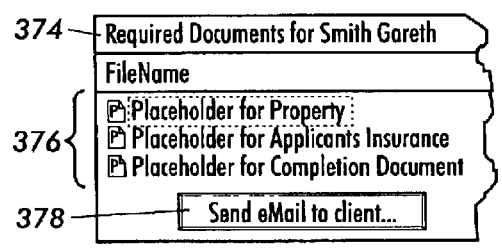
FIG. 31(b)
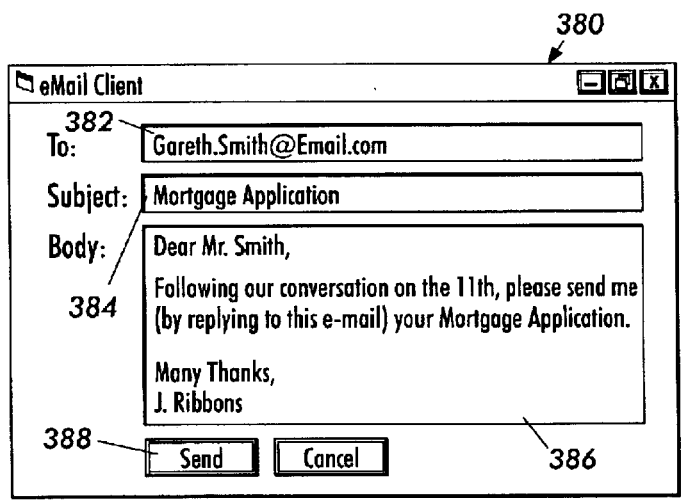
FIG. 31(c)
FIG. 31(d)

ELECTRONIC FILING SYSTEM WITH FILE-PLACEHOLDERS

CROSS-REFERENCE TO RELATED APPLICATIONS

Cross-reference is made to the U.S. patent application concurrently filed herewith entitled "Electronic Filing System With Scan-Placeholders", which is hereby incorporated herein by reference.

BACKGROUND OF INVENTION

The present invention relates to an electronic filing system and a method of operation, and more particularly, to a filing system for electronic representations of documents, such as text documents, graphical documents, or captured images of documents.

In a computer-based, or electronic, filing system there are many situations in which a file is expected to arrive in the future but is not currently available in the context of interest.

One example is in a processing system for handling, for example, mortgage application documents. An application for a property mortgage will normally involve an application form being processed, followed by other documents which are also required, but which may arrive later. For example, such documents might include a written survey of the property, a reference from the applicant's employer, copies of salary statements, a credit-check form, or a written guarantee from a guarantor. Even later, but equally essential, documents may include a copy of the property transaction, or a copy of the property deed.

Another example is where a person is expected to produce a document periodically, such as a monthly report.

A further example is where a letter or message is sent requesting a reply. The outgoing message document may be stored in electronic form, and a reply to the message is explicitly requested. This could apply to a document handling system, or to an electronic messaging system, such as an e-mail system.

A yet further example is a workflow system for monitoring the situation of pending work. A resulting file is expected to be inputted into the workflow system upon completion of a pending task, so that the state of the task can be updated.

Conventionally, filing systems deal with expected occurrences, for example, expected future documents or replies, by setting a reminder entry in an automatic scheduling system. For example, the reminder may be a calendar reminder that a certain document or task is expected to be completed. Such systems therefore mirror or simulate a typical manual office system, in which a calendar schedule is used as a prompt for the expected file.

In a related field, further problems lie in the relatively inelegant current methods which a user generally has to use for scanning a paper document into a document filing system. Generally, this involves the user manually running a scanning application to capture a digital image of the paper document, and then manually controlling any conversion utilities to transform the captured image (such as optical character recognition (OCR) to convert a captured image to text). Once this has been completed, the user has to manually save or upload the file into the document filing system. The document file is allocated a specific filename after scanning; it is not normally possible to allocate a specific filename in advance (i.e., prior to scanning). The conventional technique therefore requires considerable user input, and is time consuming and inconvenient to have to repeat for a large number of paper documents.

It would therefore be desirable to improve the way in which expected files are handled in an electronic filing system.

SUMMARY OF INVENTION

In accordance with the present invention, a placeholder is used to provide an explicit representation of a file (or a state) which is not currently recognized as existing, but which is explicitly expected in the future.

In one embodiment, the placeholder is a filing system object in a filing system, in the same manner as any other file or folder. The filing system may, for example be of the hierarchical type in which objects are arranged in a hierarchical structure, or it may be of the attribute type in which objects are organized according to one or more object attributes. A further type is that in which files are allocated, and organized according to, unique file organization identifiers.

One advantage of defining a placeholder as an object within the file management system is that the placeholder object is a real object which is recognized by the file management system, and can be organized (e.g., hierarchically or using attributes or identifiers) in the same way as any other (existing) file, even though, the expected file represented by the placeholder may not actually exist yet.

Another advantage is that filing system objects can provide a focus for actions associated with those objects. For example, if the object is a file, it may be opened by simply "clicking" a pointer or cursor on the object in a graphical display. It is also conventional to provide a sub-menu of commands or options associated with the object (such as a contextual menu). The same applies to placeholder objects, which can provide a focus for operations concerning the expected file.

A feature that distinguishes a placeholder (which represents an expected file or state) from an already existing file is that the placeholder can be "redeemed" with the expected file when this arrives or is presented. The term "redeem" is intended to be interpreted broadly in the sense that the placeholder provides a "door" or "place" for the expected file. In many cases, the placeholder will be deleted when the expected file arrives or is presented. However, there are also situations in which the placeholder can be retained.

In another embodiment, a placeholder is an object which represents a single expected file.

In yet another embodiment, a placeholder is described which represents a document that is expected in paper form to be input via a document imaging device, such as a scanner or a digital camera. The placeholder preferably includes (or refers to) scan control information which can be used to at least partially automate the scanning of the document, and its uploading to a file storage system.

In yet a further embodiment, a placeholder is described which can accommodate multiple (e.g., draft) versions of an expected file, until the final version of the file arrives to complete the redemption of the placeholder.

In accordance with one aspect of the invention, there is provided an electronic document processing system, and method therefor, for processing electronic representations of documents. The system includes an electronic filing system, a placeholder object generator, and a placeholder controller. The electronic filing system manages filing system objects. The filing system objects managed by the electronic filing system include an electronic document file class of filing system object that is associated with an electronic document file. The placeholder object generator generates a placeholder class of filing system objects in the electronic filing system that are distinct from the electronic document file class of filing system objects. Each placeholder object generated by the placeholder generator is (a) stored in the electronic filing system with metadata that identifies an expected document file that is to be created in the electronic filing system and (b) represents the expected document file which is not recognized as being present in the electronic filing system but which is explicitly expected to be stored in the electronic filing system. The placeholder controller performs a redeem operation to redeem a placeholder object when the expected document file is presented; the expected document file being recognized as being present in the electronic filing system after the placeholder controller redeems the placeholder object.

BRIEF DESCRIPTION OF DRAWINGS

These and other aspects of the invention will become apparent from the following description read in conjunction with the accompanying drawings wherein the same reference numerals have been applied to like parts and in which:

FIG. 7 is a schematic representation of a redeem screen at a terminal of the system of FIG. 1;

FIGS. 31a, 31b, 31c, and 31d schematically depict the use of placeholders in a workflow or messaging system.

DETAILED DESCRIPTION

A. Placeholder Objects And Operating Environment

Figure 1:
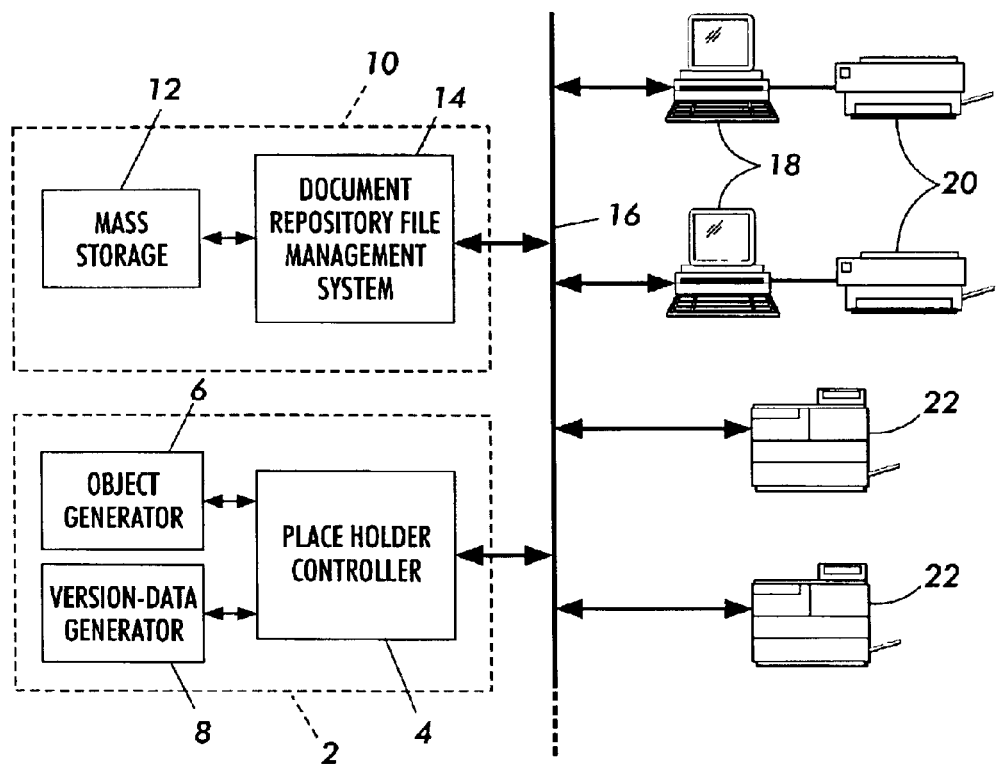
FIG. 1 is a schematic diagram showing the functional components of an electronic network-based document processing system.

Referring to FIG. 1, a first embodiment of a network-based document repository system 10 is described. The system generally includes one or more mass storage devices 12 (for example, semiconductor, magnetic or optical storage devices), coupled to a file management system 14. The file management system 14 organizes stored document files as objects within a hierarchical structure. The files are generally document files, which may be of different file types (indicated, for example, by a unique file name extension).

The file management system 14 is coupled via a network 16 (for example, the Internet or an intranet) to one or more user terminals. The user terminals may include one or more desktop type computers 18, which may optionally be provided with printer and/or scanner devices 20. Each computer terminal 18 may retrieve documents from the repository system 10 for viewing, and optionally for printing. New documents may also be scanned into the computer terminal 18 (or otherwise received electronically at the computer 18) for transmission to the document repository system 10.

Additionally, the user terminals may include one or more multifunctional document processors 22, which typically combine one or more printing, copying, scanning, or faxing functions. Documents may be directly retrieved and printed at the multifunctional document processor 22, or paper documents may be directly scanned "into" the document repository 10.

The manner of setting up and using such a document repository will be known to those skilled in the art, and so need not be described further here. A suitable system for implementing the above are, for example, DocuShare™ and FlowPort™ from Xerox Corporation.

Communicating with or form part of, directly or indirectly and/or partially or entirely, the file management system 14, desktop computers 18, printer and/or scanner devices 20, and multifunctional document processors 22 are placeholder elements 2. The placeholder elements 2 include a placeholder controller 4, an object generator 6, and a version-data generator 8, each of which is described in more detail below and which may be used to carry out one or more of the embodiments described herein.

Generally, the placeholder controller 4 includes functionality for performing control operations with respect to creating, deleting, and redeeming file, scan, and version placeholders. The object generator 6 includes functionality for generating different classes of placeholder objects, including file (or filing), scan, and version placeholder class of objects. The version-data generator 8 provides functionality for generating version-data associated with placeholder objects.

Figure 2:
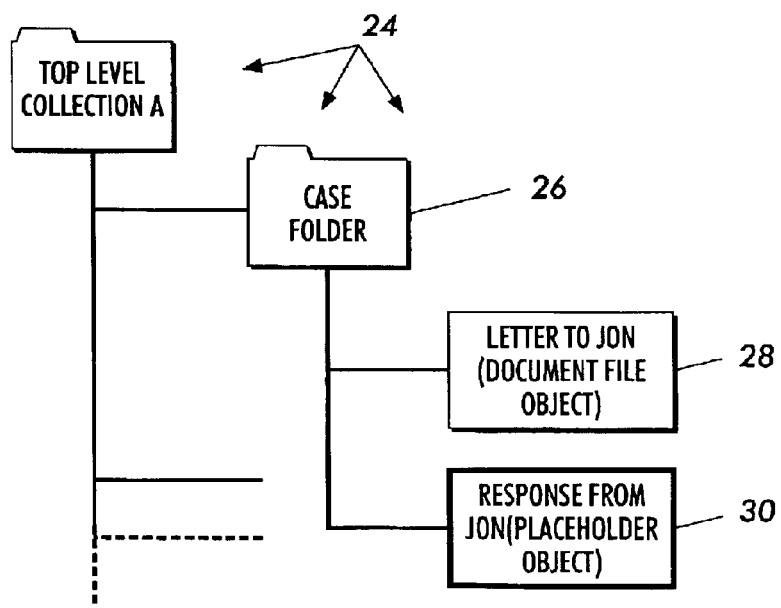
FIG. 2 is a schematic diagram showing a hierarchical filing structure of the file management system in FIG. 1.

FIG. 2 shows, by way of example, a hierarchical structure of filing system objects 24 within the logical filing structure of the file management system 14. An example of a hierarchical file management system is Windows® from Microsoft Corporation. However, it will be appreciated that the invention is not limited to hierarchical file management systems, and may be used with other types, for example using one or more object attributes or identifiers for organizing objects.

The present structure includes a hierarchical folder 26 (actually a subfolder) called "Case Folder", which contains a document file object 28 called "Letter to Jon". The file may be "retrieved" from the repository system 10 by any of the terminals 18 or the multifunctional document processor 22, by selecting the document file object 28 on a display at the respective terminal 18 or multifunctional document processor 22.

In addition to files which actually exist, the present embodiment newly accommodates files which are not recognized as being present, but which are explicitly expected in the future. In other words, the files might not currently exist, but are explicitly expected to exist, or to be presented, in the future. In the present embodiment, such files are accommodated by defining a placeholder object 30 (actually a file) which the file management system 14 recognizes as being an explicit representation of a file, or state, which is explicitly expected in the future. Such a placeholder object 30 may, for example, be designated by a different filename extension, recognizable to the file management system 14. It will also be appreciated that the system may provide for placeholders of different types, to represent different types of expected files (such as different types of document files), and/or to represent different placeholder categories with differing functionality (as will be apparent from later description).

Figure 3:
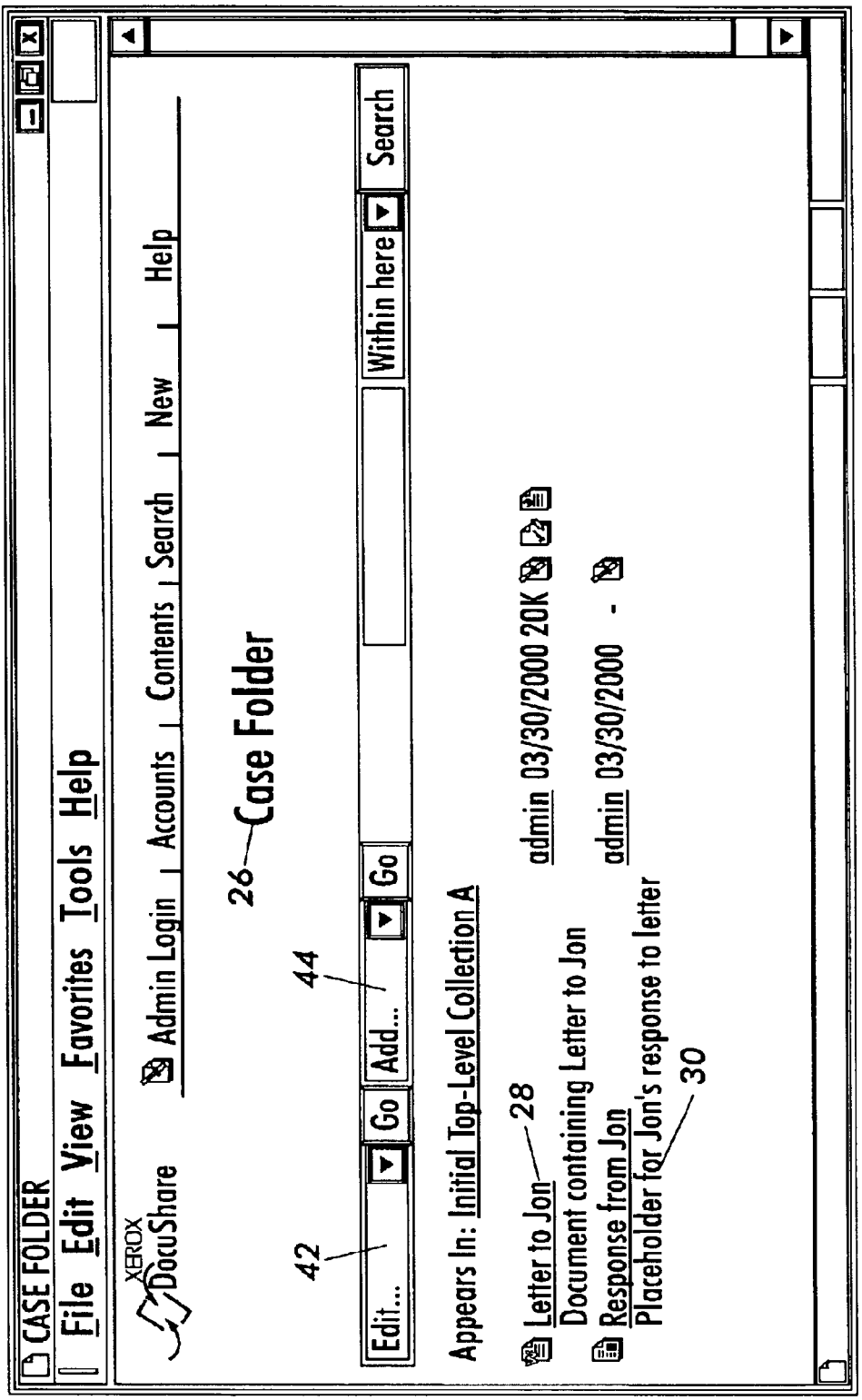
FIG. 3 is a schematic representation of a computer display at a terminal of the system of FIG. 1.

FIG. 3 shows, by way of example, a display of the hierarchical folder 26 "Case Folder", containing the first document file object 28 called "Letter to Jon", and a second placeholder object 30 called "Response from Jon". In this case, the placeholder object 30 provides an explicit representation that a reply is expected from Jon, in the form of a processable object 30. It will be appreciated that the expected "response" document file is represented by a real object 30 within the file management system 14, in the same manner as other existing files, even though the "response" document file does not yet itself exist.

One advantage of defining a placeholder as an object 30 within the file management system 14 is that the placeholder object 30 is a real object which is recognized by the file management system 14, and can be organized (for example, hierarchically) in the same way as any other (existing) file, even though, as mentioned above, the expected file represented by the placeholder may not yet exist.

Another advantage is that each object within the file management system 14 may have one or more information parameters (metadata) associated with it. This applies to existing document file objects 28, but it also applies to placeholder objects 30 (which are treated like any other object). Therefore, the placeholder object may include information such as one or more of: the date of creation of the placeholder; a date by which the expected file should arrive; who requested the file (e.g. the author of the placeholder); the source of the expected file; the type of file expected; parameters for use by an input device for inputting the document into the system (as described in more below in another embodiment); and a target location (filename and/or directory) under which the file should be stored in the document repository when it is presented.

Yet a further advantage is that each object can provide a "focus" for carrying out operations concerning the object. For example, where the object is a document file, a user may open the file simply by "clicking" a pointer or cursor on the object in the visual display of the terminal. In the case of a placeholder object 30, the default action, when "clicking" on the object, may be to redeem the placeholder.

Additionally, or alternatively, it is conventional to provide a submenu of commands or options associated with an object (or with each type of object) that can be displayed on request by the user. The same applies to placeholder objects 30, which can provide a focus for operations concerning the placeholder. In particular, a sub-menu may be provided in which at least one of the commands is to redeem the placeholder with the expected file. Another command may be provided to generate a copy of the placeholder object, which could be useful for setting up placeholders for related or similar expected files.

Various examples are now described to illustrate the uses of placeholder objects. All examples use the same placeholder principles, but with different applications and specific details. Therefore, it will be appreciated that ideas from one example are fully compatible to be mixed with other examples, and this is explicitly envisaged.

A.1 File-Placeholder Objects

File-placeholders will now be described in which a placeholder object 30 is created in the file management system 14 by the object generator 6 that represents a single expected file. When a file corresponding to the expected file of the placeholder, the placeholder controller 4 deletes the placeholder object that was created in the file management system 14.

In the present embodiment, a placeholder object 30 may be generated automatically, or manually using the object generator 6. For example, if an application program (such as a mortgage processing application) expects a certain document to be received, then an object generator 6 that forms part of the application program could automatically generate a placeholder object 30 representing the expected document file. If more than one document is expected, then it is of course possible to generate a plurality of placeholder objects 30, each representing a respective one of the document files.

Another example is, in the case of a schedule system, if a document is expected periodically, for example a monthly report. A placeholder object 30 could be generated automatically at the time when the report is expected. Alternatively, a placeholder object 30 for a next report could be generated automatically when the placeholder object for the previous report is redeemed.

Another example is when a person indicates manually to an application program that a reply to a letter is expected, or that a reply to a telephone conversation, is expected. The application program can create a placeholder object 30 for the expected reply.

Figure 4:
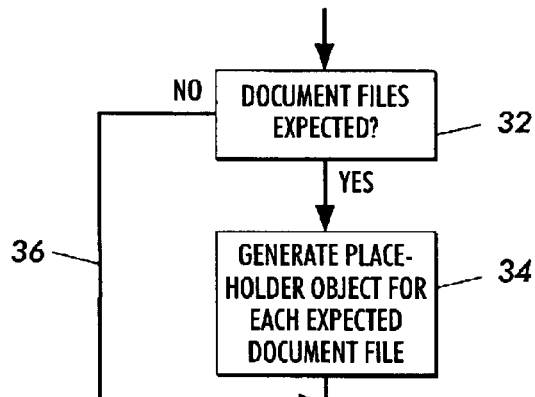
FIG. 4 is a schematic flow diagram showing automated generation of placeholder objects.

An application program could execute the steps shown in FIG. 4, which include a step 32 of deciding whether any documents are explicitly expected. If the answer is "yes", the program proceeds to step 34 at which the placeholder objects 30 are generated for the expected files within the file management system 14. If the answer at step 32 is "no", then the program branches on path 36 to skip step 34.

The above are merely examples; there are many other situations in which an application program could generate an automatic placeholder object 30 for an expected file.

Figure 5:
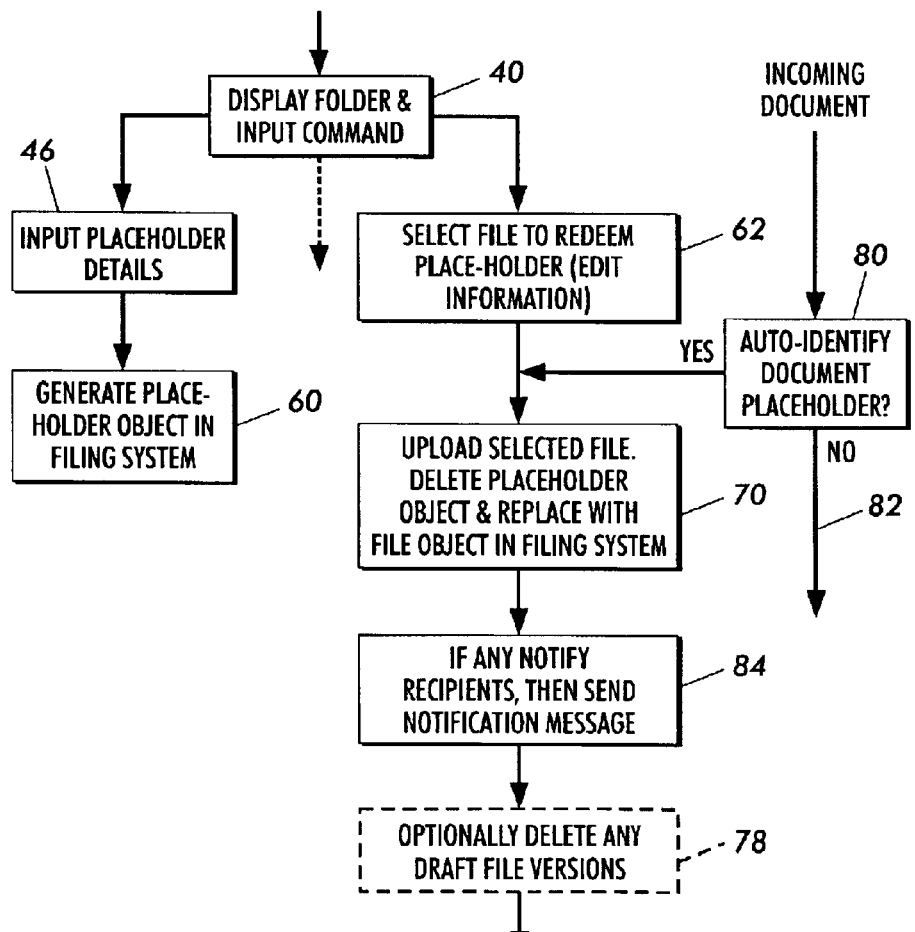
FIG. 5 is a schematic flow diagram illustrating the processing steps for processing a placeholder object.
Figure 6:
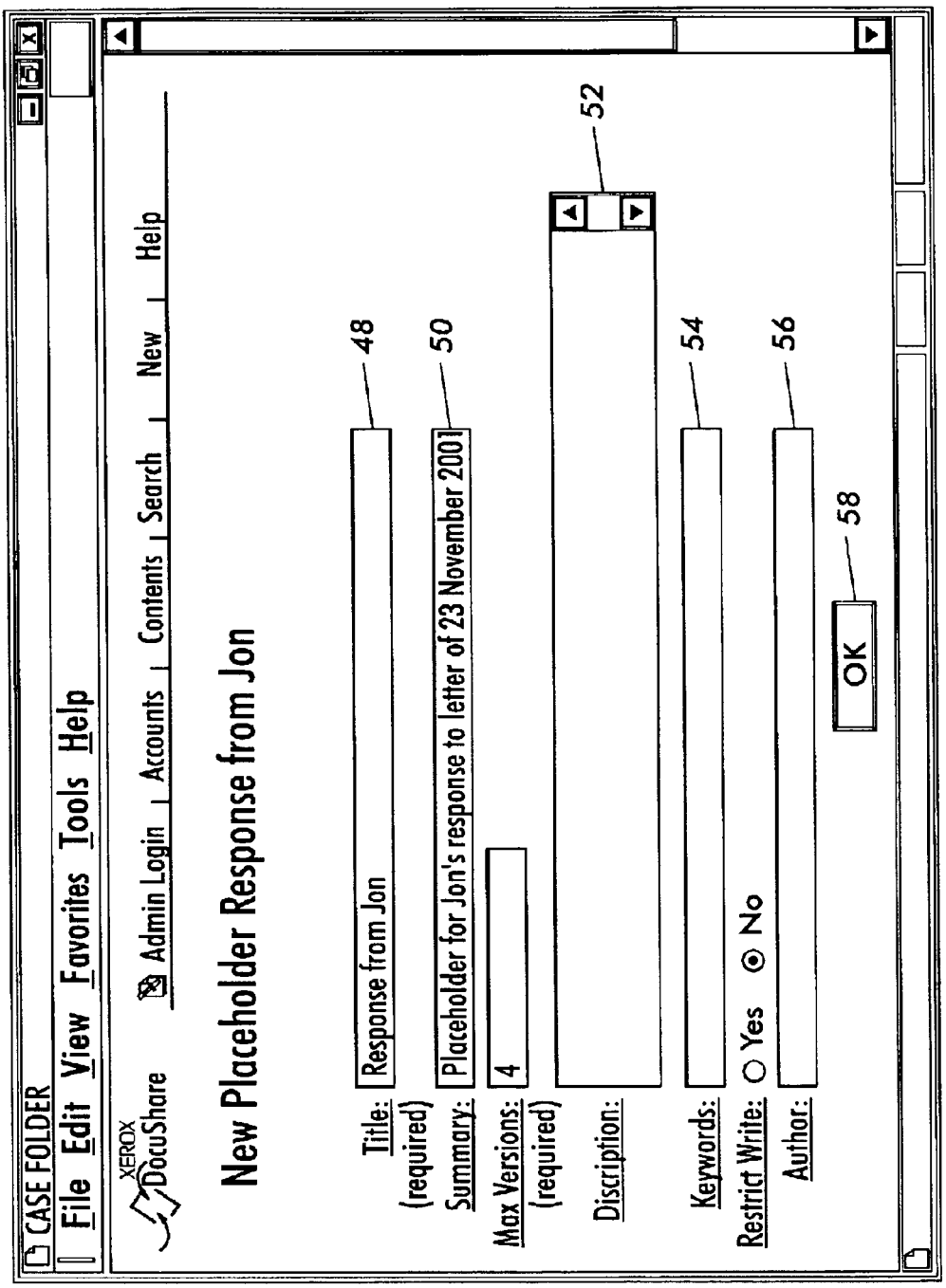
FIG. 6 is a schematic representation of a placeholder creation screen at a terminal of the system of FIG. 1.

Referring to FIGS. 3, 5 and 6, an alternative is to generate the placeholder object 30 manually, or more specifically, for the file management system 14 to insert a placeholder object 30 upon a user's manual request. FIG. 5 shows the processing steps required. It will be appreciated that FIG. 5 is a schematic representation which attempts to combine processing both within the file management system 14 and within the user's computer or terminal 18. In FIG. 5, a step 40 is shown for generating a display of a current (for example, hierarchical) document folder (as in FIG. 3), and for inputting a command from a user, for example, by the user selecting commands from pull-down menus 42 and 44.

In the embodiment shown in FIG. 3, a user may add a placeholder object 30 manually by selecting a command in the "Add" pull-down menu 44 or edit an existing placeholder by selecting a command in the "Edit" pull-down menu 42. If a Microsoft® Windows style interface were used instead, then the command for a new placeholder would appear in the conventional "New" item in the "File" Menu (i.e., File→New→Placeholder).

The Add or New command takes the user to step 46 (FIG. 5) at which a manual input screen displayed, an example of which is shown in FIG. 6. The user may enter information (metadata) about the placeholder and the expected file that the placeholder is to represent. In this example, the information includes a title 48, and optionally one or more of a summary 50, a description 52, a list of keywords 54 (for searching), and an author section 56 (for identifying the creator of the placeholder). The information will also include a date of creation (and a date of modification) which is appended automatically by the file management system 14 (and so is not a user enterable parameter in FIG. 6). When the user clicks the "OK" button 58 at the bottom of the screen, the process proceeds to step 60 (FIG. 5), at which a corresponding placeholder object 30 is generated within the hierarchical filing structure (as explained above with reference to FIG. 2).

A feature which distinguishes a placeholder object 30 from other file objects 28 is that a placeholder object 30 is "redeemable" with the expected file. In this example, when the expected file arrives, or is presented, then the placeholder object 30 is replaced by the actual file instead, and can inherit parameter information (metadata) from the placeholder object 30.

Referring to FIGS. 3, 5 and 7, in order to redeem a placeholder object 30, the user first selects the placeholder on the screen, and then selects the "Redeem" command in the pull down menu 42 at step 40 (FIG. 5). This takes the user to step 62, at which a "redeem" screen (FIG. 7) is displayed to enable the user to designate which current file is the response from Jon, for replacing the placeholder object 30. This assumes that the expected file has now arrived on the user's machine, and is awaiting presentation to the document repository system 10.

Referring to FIG. 7, the "redeem" screen is similar to the placeholder input screen of FIG. 6, except that it includes a document filename box 64 for the user to input the filename of the document to replace the placeholder object. The screen also includes a "browse" button 66 which a user can select to launch a known type of file lister (browser) from which the file can be selected from the files available to the user. In this example, the metadata displayed in FIG. 7 is the same data as that entered for the placeholder object 30. In other examples, an application program may update some or all of the metadata, or create new metadata, according to the application program.

If desired, the user can edit any of the metadata before it is inherited by the newly presented document file. When the user clicks the "redeem" button 68 at the bottom of the screen, the process proceeds to step 70 (FIG. 5) at which the placeholder object 30 is deleted, and the document file is uploaded to the file management system 14 in place of the placeholder 30.

Figure 8:
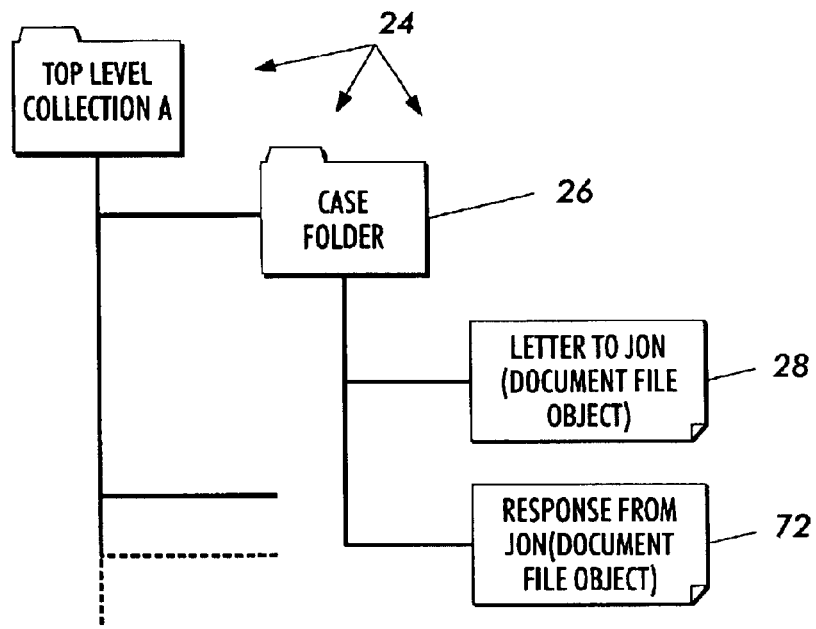
FIG. 8 is a schematic diagram showing the hierarchical filing structure after redemption of a placeholder.

FIG. 8 shows, schematically, the hierarchical structure of the objects within the logical filing structure of the file management system 14, after the placeholder object has been replaced by the actual document file 72 containing the "response from Jon". In the present example, the file object 72 is placed in the same logical folder 26 (called "Case Folder") as the placeholder object 30 it replaced. In other words, the placeholder object represents an exact representation of the "place" where the file will be stored. However, it will be appreciated that, if desired, the placeholder object could contain information pointing to another location (a target location) in which the file 72 should be stored when it is presented to redeem the placeholder object 30.

The present example has assumed that a manual redeem operation should be carried out so that a user can match up a file to the respective placeholder object manually. However, there are many situations in which automatic matching may be possible. For example, if the expected document file includes a unique identifier, such as a document reference number, or a placeholder reference number, then this could be processed automatically to match the document to the placeholder object 30. In the present example, the user's "letter to Jon" document file 28 could quote a unique document identifier, which is also stored as metadata for the placeholder object 30. The unique identifier and the placeholder object could be generated when the original letter expecting a reply is written.

When a document file is uploaded to the repository system 10 (without a manual redeem operation), an automatic "match" operation can be performed (step 80 in FIG. 5) to try to locate a placeholder object which matches the incoming document file, for example, by reference to a unique identifier. If at step 80, a matching placeholder object is identified, then the process branches to step 70 to redeem the placeholder object, as described above. If at step 80, no matching placeholder object is identified, the process continues along path 82 to bypass the redeem operation.

In the present example, the metadata for a placeholder object 30 may also include the names of one or more recipients to be notified when the document arrives. For example, a notification message may be sent by email, or another messaging system, over the network 16. Referring to FIG. 5, the process may include a further step 84 of sending the notification to any indicated recipients once the placeholder object 30 is redeemed. This is especially useful in combination with the automatic-redemption technique (step 80) if a placeholder object 30 is redeemed automatically (but it is not limited only to such an automatic redemption technique).

Figure 30:
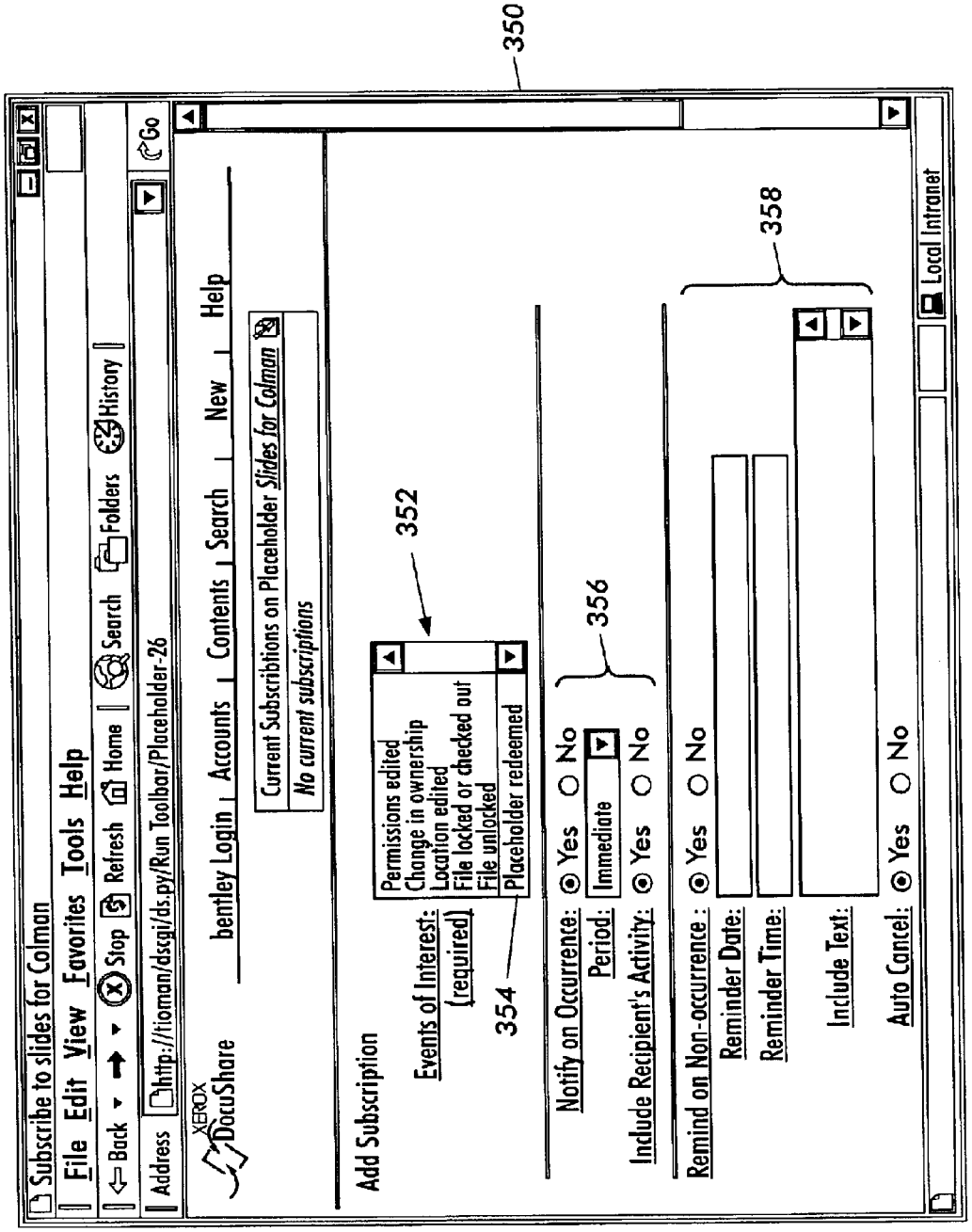
FIG. 30 is a schematic representation of an input screen for inputting subscription details for notification upon the occurrence, or non-occurrence, of a particular placeholder event.

FIG. 30 illustrates an input screen 350 for enabling a user to "subscribe" to events concerning the placeholder object. A subscription is a known technique in which a user can "subscribe" to be notified regarding the occurrence of a selectable event.

In FIG. 30, a sub-menu 352 enables the user to select the relevant event, such as the redemption of the placeholder object (item 354). Input selectors 356 enable the user to indicate whether he desires to be notified when the event occurs.

Another important feature is the ability to issue a notification if the placeholder object has not been redeemed by a certain target date and/or time. Therefore, as a novel improvement over subscription, additional input selectors 358 enable the user to indicate whether he desires to be notified if the event has not occurred by a predeterminable date and/or time.

In addition, a notification can be issued for other reason than lapses of target dates or times. Alternatively, notifications can be generated if content or a reference of a placeholder is missing. For example, a non-occurrence event may occur if a set of documents is expected by a placeholder but one is missing when the documents arrive. Also, a non-occurrence event may occur if a document is redeemed and another document on which the redeemed document relies, or which is required to make use of the redeemed document is not redeemed as well.

More generally, non-events are distinguished from events because non-events draw attention to potential problems and provide notification of problems that need to be fixed, as opposed to events that are not intended to require affirmative action in response to their receipt.

Therefore, by using placeholder objects as real objects in the file management system, events concerning the objects (in particular redemption of a placeholder object) can be accommodated even though the expected file might not yet exist. Advantageously, even though a document may yet exist, its placeholder can be used to account for dependencies with respect to other documents and/or placeholders.

A.2 File-Placeholder Objects With Versions

In the first example, the placeholder object 30 was replaced by the actual file when the file was presented. In a second example, a technique is described which enables one or more versions of the expected document file to be accommodated. There are many situations in which different versions of the same document may be expected (for example: different language versions; different versions for printing or for display; updated versions of a document; or versions including comments from multiple people).

One specific example is when a draft version of an expected document may be presented, or may be available, pending arrival of the final expected document. For example, if a report document is expected but is not yet ready, certain information may still be available in a draft of the report submitted by the report author. In such a case, a placeholder object 30 can provide a very convenient mechanism for enabling a draft version of a document to be submitted to the repository, associated with the placeholder, and yet still provide an indication that the final document is explicitly expected by the system.

Figure 9:
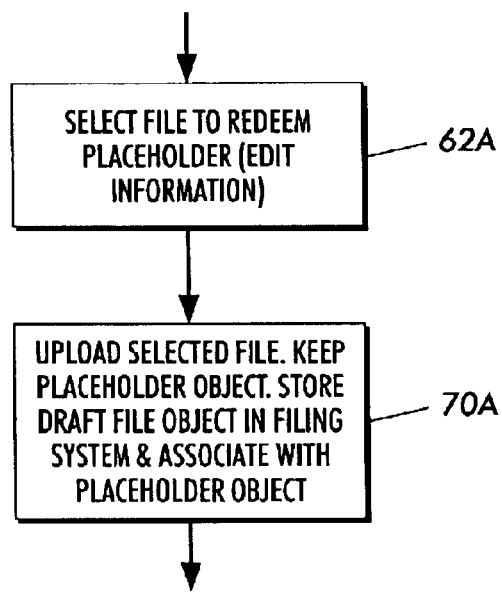
FIG. 9 is a schematic flow diagram showing the processing steps required to redeem a draft file against a placeholder.

Referring to FIG. 9, the steps for redeeming a draft version of a document file against a placeholder object are similar to the redemption steps already described with reference to FIG. 5. In a similar manner to FIG. 5, it is assumed that the draft file already exists on the user's computer 18. In FIG. 9, the process proceeds through steps 62A and 70A, similar to the steps 62 and 70 described above while referring to FIG. 5.

At step 62A, the user is presented with an input screen (FIG. 7) at which the user can select the local file to be uploaded to the repository system 10 as the draft version of the expected file. At step 70A, the selected file is uploaded, to be stored alongside and associated with the existing placeholder object 30. In contrast to the previous example, instead of deleting the placeholder object 30, the placeholder object 30 is retained to provide an explicit indication that the final version of the document is still awaited (and still explicitly expected).

The steps of FIG. 9 could be carried out as an independent process if, for example, the user were to select a "redeem draft" command from the pull down menu 44 at step 40 (FIG. 5). The pull down menu 44 would then include at least two different commands, being "redeem" (which carries out steps 62 and 70 of the first example), and "redeem draft" (which carries out steps 62A and 70A as above).

Alternatively, the redeem screen of FIG. 7 could be modified to provide a second input button 74 labeled "Redeem Draft" (shown in phantom in FIG. 7), which would cause the program to execute step 70A (for a draft document version) instead of step 70 (for the final document version).

Figure 10:
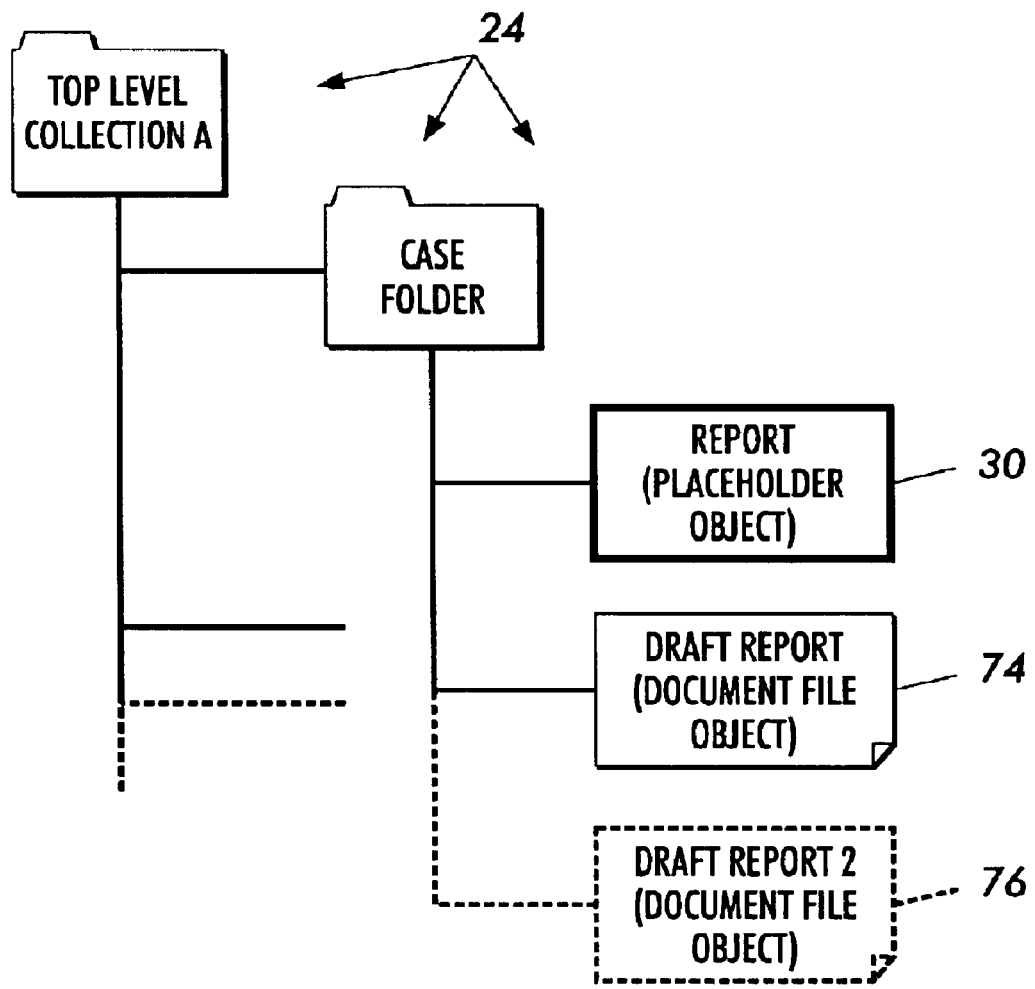
FIG. 10 is a schematic diagram showing the hierarchical filing structure containing a draft file.

FIG. 10 shows schematically the hierarchical structure of the objects 24 within the logical filing structure of the file management system 14, after a draft document file 74 has been redeemed as a draft document against the placeholder object 30. In the present example, the expected document is a report, represented by a placeholder object 30.

Referring to FIG. 10, when the draft document file 74 representing the draft report is uploaded (step 70A of FIG. 9), the document file object 74 is stored in the same folder 26 ("Case Folder") as the placeholder 30. If a later version of the draft document becomes available, and is uploaded to the document repository 10 as a draft, then this could either overwrite the first draft (so that only the latest draft is retained), or it could be stored as a second draft document file 76 (shown in phantom). This latter method would allow the full history of the drafts to be stored and viewed later. The placeholder object 30 is retained until the final version of the document is redeemed.

Figure 11:
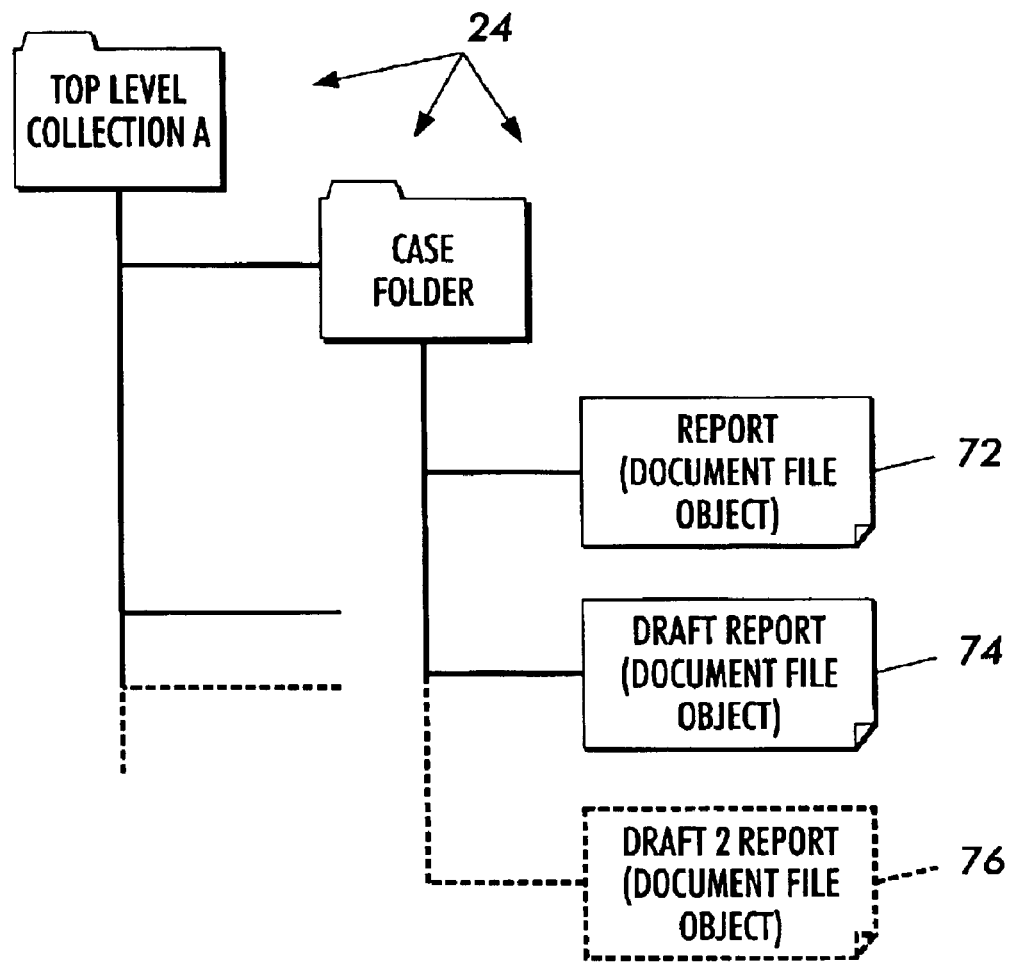
FIG. 11 is a schematic diagram showing the hierarchical filing structure after redemption of a file after draft versions have been redeemed.

Referring to FIG. 11, when the final version of the document is redeemed against the placeholder (step 70 of FIG. 5), the placeholder object is deleted and is replaced by the actual final document file object 72, as in the first example. Any draft versions of the file can either be retained (as shown at 74 and 76) to enable the history of the drafts to be viewed later, or the draft versions could be deleted (as shown as an optional step 78 in FIG. 5).

If the placeholder includes any notification information, then notifications could also be sent to recipients once a draft version of a document is redeemed against the placeholder object, in a similar manner to step 84 of FIG. 5.

In this example, the draft versions of the document are described as being stored in the same folder as the placeholder object 30 with which they are associated. However, it will be appreciated that the placeholder may contain information pointing to another location (a target location) in which such draft versions should be stored when presented to the repository system 10 using the placeholder object 30.

It will be appreciated that the "draft" example described above is merely an example of a more generic "version" placeholder which accommodates different versions (possibly different expected versions) of the same document. It is preferred that the version placeholder object include metadata to track the history of the document versions so that the history is available from the placeholder object (rather than having to track down each version separately). A parameter can be used to keep track of the version, e.g. version numbers, so that the placeholder can be modified for a next expected version. A placeholder can be modified by updating its metadata to expect a different document (version).

The information stored in the placeholder can also be used to determine how the history is to be displayed in the user interface (for example, only the latest version might be displayed, or the last "n" versions, or all versions).

A.3 Scan-Placeholder Objects

In the above examples, it has been assumed that the expected document is already available in electronic form as a file object that can be uploaded to the document repository 10. Thus the placeholder objects 30 might be classed as "file-placeholders". If a document is received in paper form, then it is of course possible to convert the document into electronic form using, for example, a digital image capture device such as a digital camera or a scanner (e.g. the units 20 or 22 in FIG. 1).

However, such a technique is clumsy from a technical (or automated) point of view, in that it requires manual processing at the user's terminal 18 to set up the scanner parameters, manually input the document as a file onto the user's computer terminal 18, and then manually associate the file with a placeholder object in the document repository 10.

Figure 12:
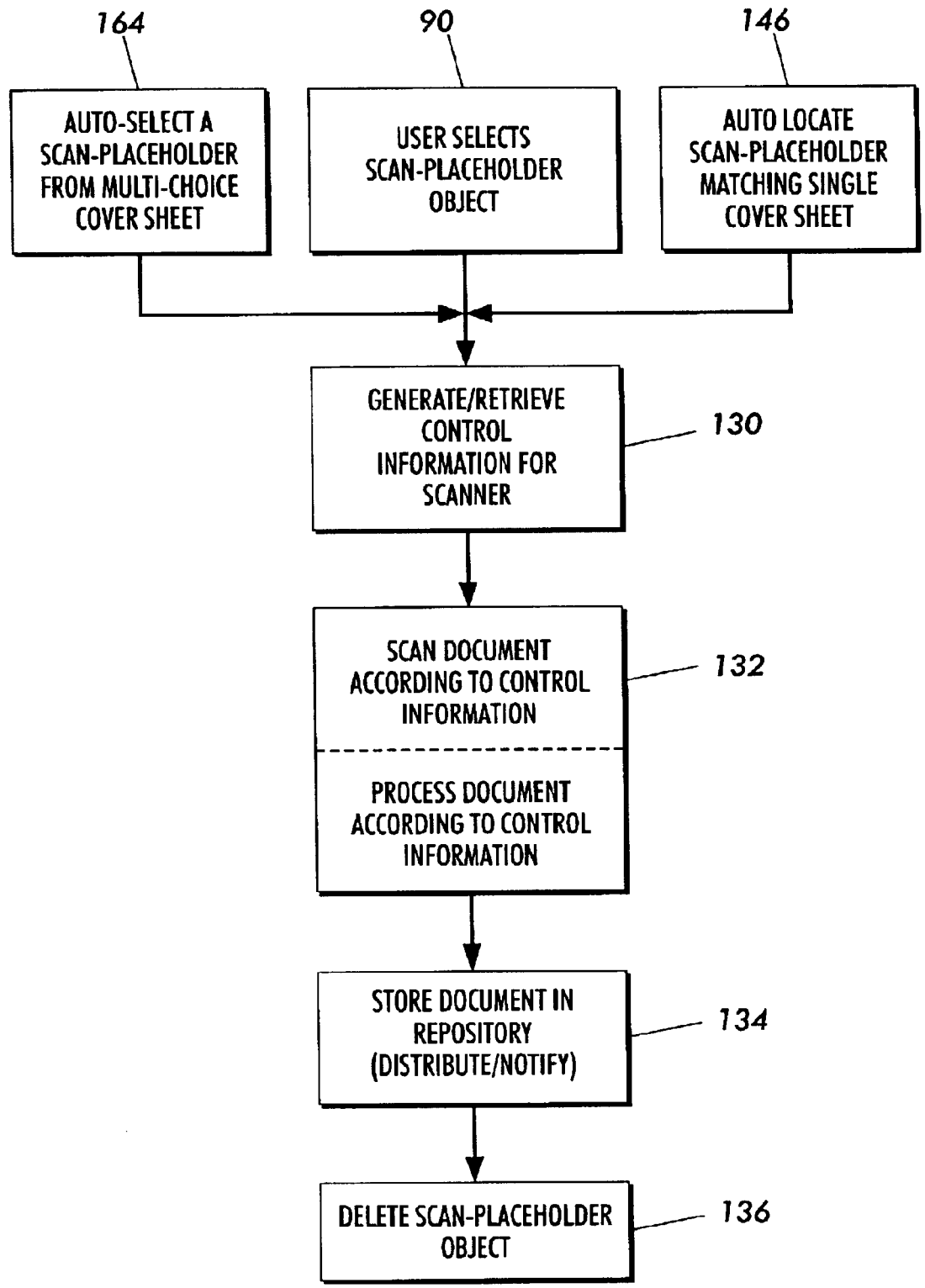
FIG. 12 is a schematic diagram illustrating the functionality of a scan-placeholder.

Therefore, referring to FIG. 12, the present embodiment also provides a type of placeholder object specifically for documents which are expected in paper form. Such a placeholder object is referred to herein as a scan-placeholder object 90. This differs from a file-placeholder object 30 in that the source of the data of the incoming document is explicitly designated as a document input (e.g., scanner, digital camera, etc.), rather than as an expected electronic file.

The function of a scan-placeholder 90 is to provide a placeholder orientated approach to transform an expected paper document into an appropriate digital form, for storage in a pre-arranged location in the document repository. Such a placeholder object may be created manually or automatically in the same manner as that described above for a file-placeholder object 30 (e.g. see FIG. 4).

Figure 13:
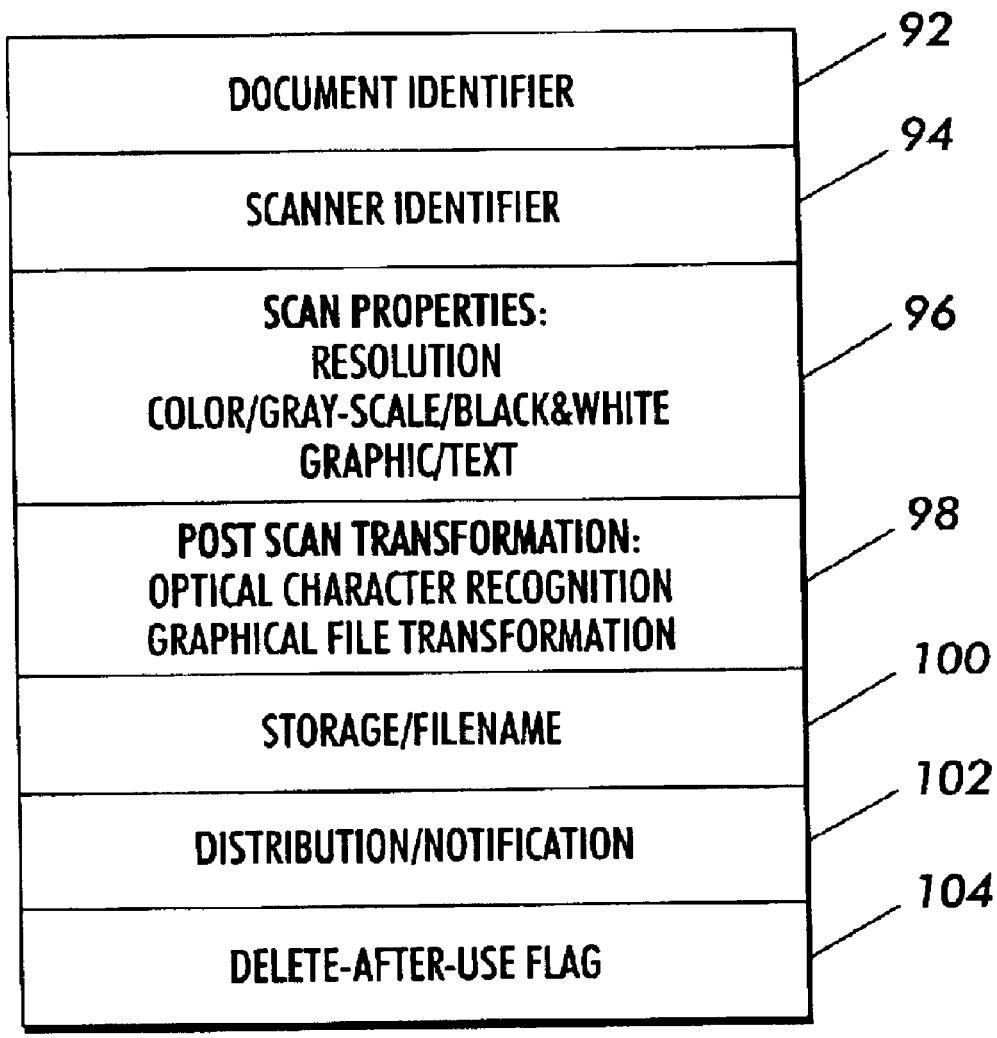
FIG. 13 is a schematic diagram illustrating the scan control information associated with a scan-placeholder.

In addition to the normal metadata associated with a file-placeholder object 30, a scan-placeholder object also includes (or at least points to) information relating to the scanning of the document. Referring to FIG. 13, such information may include one or more of:

(a) an identifier 92 for the expected document;

(b) an identifier 94 indicating the identity of the scanner to be used;

(c) scanner properties 96, such as the scanning resolution; whether the document should be scanned in color, gray-scale, or black and white; whether the document is a graphical image or text;

(d) post-scanning properties 98, such as whether the document should be subjected to any transformations such as optical character recognition (OCR), or graphical transformations, such as conversion or compression from a scanned bitmap format to a JPEG, or PDF, or TIFF format;

(e) storage properties 100, such as how the scanned document should be routed and stored in the document repository system (i.e. a target location and/or filename);

(f) notification properties 102, indicative of whether the document should be forwarded to any other users on the network 16, or whether any notification should take place to other users; and (g) a flag 104 indicative of whether the scan-placeholder object 90 should be deleted when it is redeemed with the paper document.

Additional information might also be provided, for example, for inputting multiple versions of the scanned image (for example, a version for printing, a version for displaying on a screen/web page, or a thumbnail version for browsing).

Figure 14:
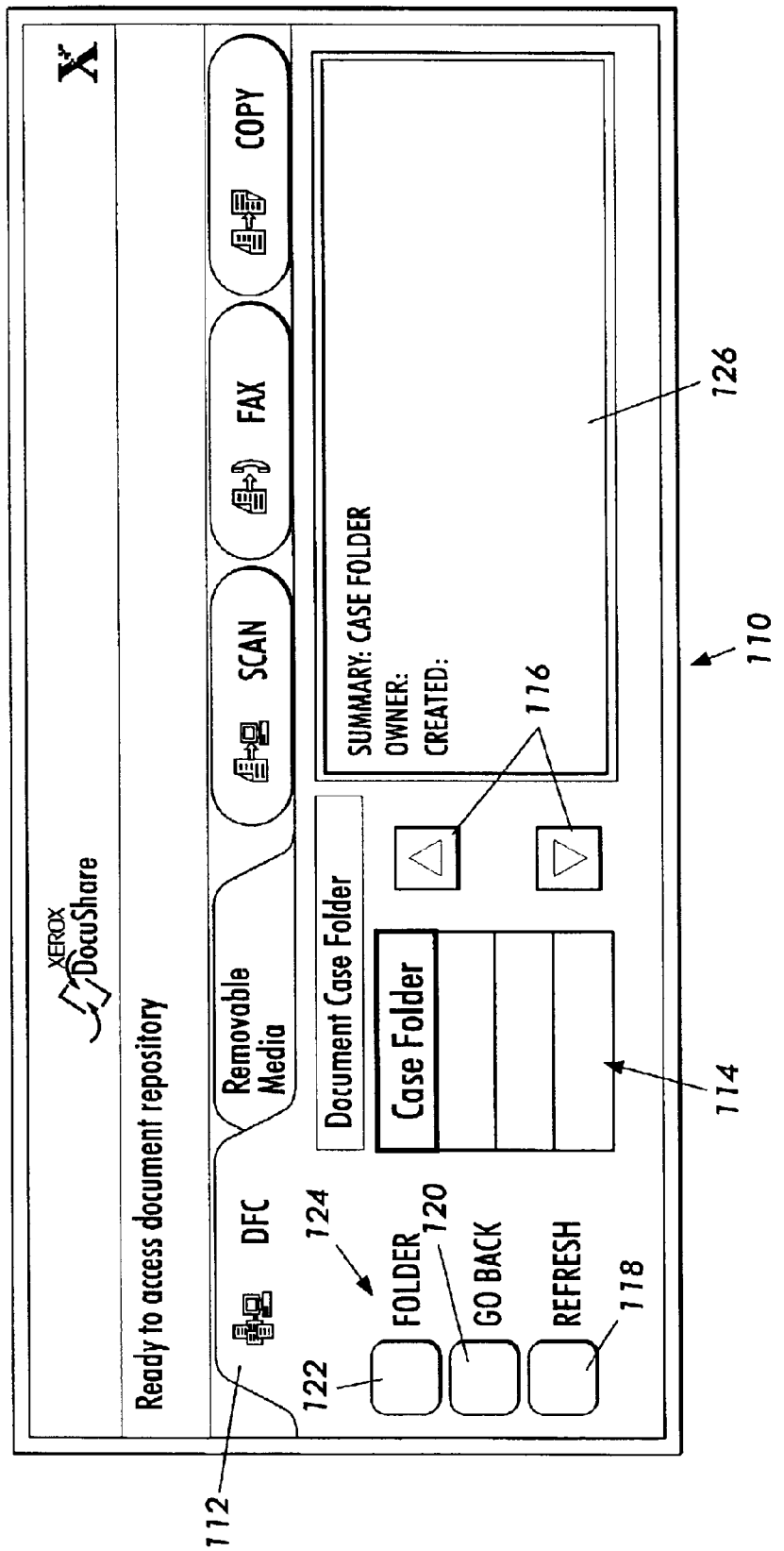
FIGS. 14, 15 and 16 are schematic representations of a touch-sensitive screen of a scanning device.
Figure 15:
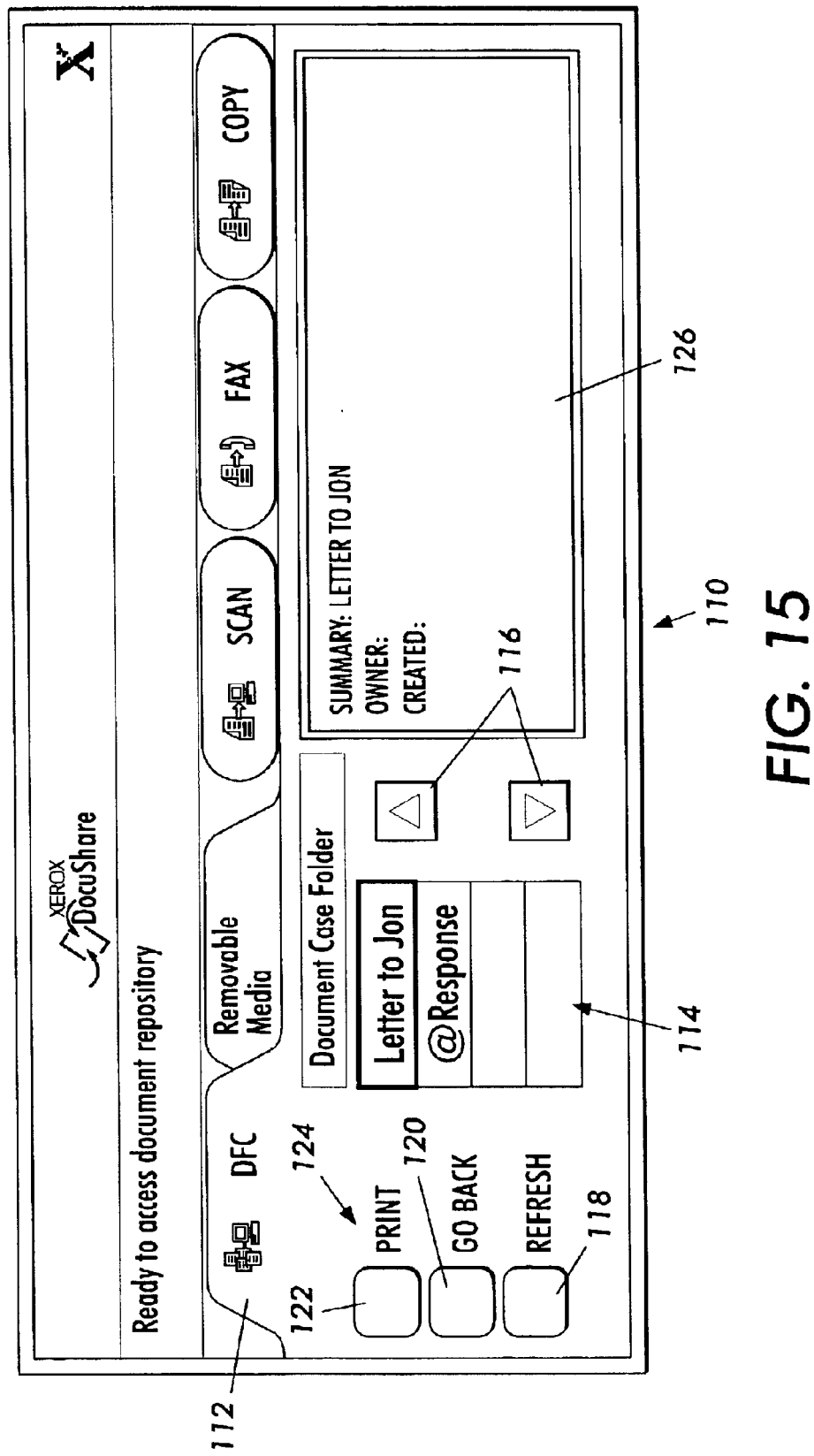
Figure 16:
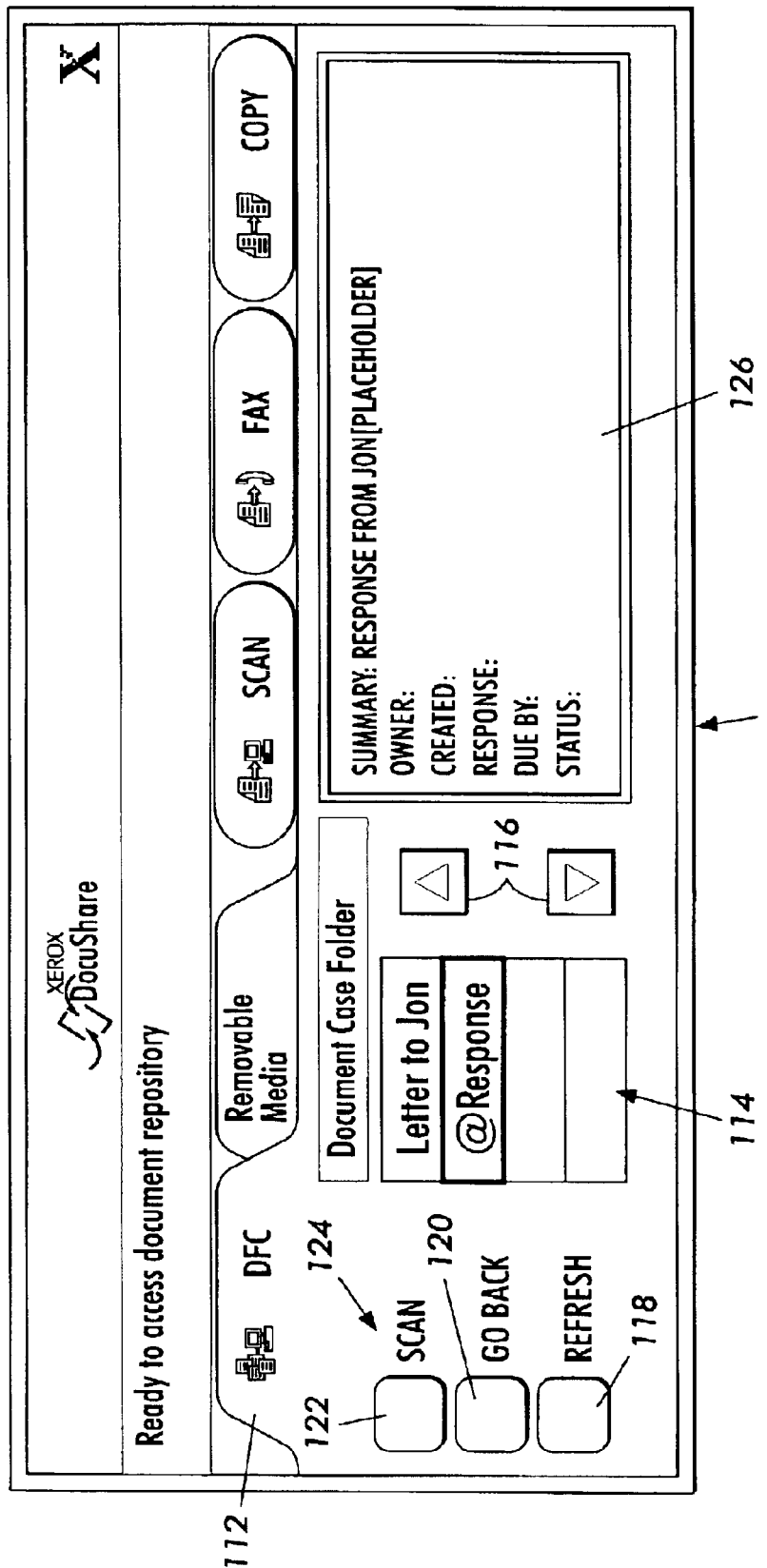

In order to scan a document into the repository 10, the user first selects the respective scan-placeholder object 90 in a graphical selection screen. By way of example, FIGS. 14–16 illustrate a selection screen 110 that may be displayed on a touch-sensitive display of a multifunctional document processor 22 (FIG. 1). The selection screen includes a display tab 112 entitled DFC (Digital Filing Cabinet). The display includes a scrollable file lister 114 with up and down selection/scroll buttons 116. The file lister 114 is able to display a list of objects from the hierarchical structure of the file management system 14, including folder names, file object names, and placeholder object names. In order to reduce the volume of information displayed to the user, the listable objects may be filtered, for example, according to the current user (so that only the information of interest to that user is displayed), or by file type, or by scanner identity.

To the left of the file lister 114 are three buttons 118, 120, and 122. The first button 118 is a "refresh" button for updating the display with any changes in the currently displayed folder. The second button 120 is a "go back" button for enabling a user to navigate back up the hierarchical file structure. The third button 122 is a multifunctional button (with a changeable legend 124) that changes depending on the kind of object currently highlighted in the file lister display 114. To the right of the file lister 114 is a general information display 126 of the metadata associated with the currently highlighted object in the file lister 114.

Referring to FIG. 14, when the current object is a subfolder, then the operation of the button 122 is to enter the subfolder (and list the contents in the file lister 114); accordingly, the legend 124 is displayed as "Folder".

Referring to FIG. 15, when the current object is a document file, then the operation of the button 122 is to retrieve and print the selected document file; accordingly, the legend 124 is displayed as "Print".

Referring to FIG. 16, when the current object is a scan-placeholder, then the operation of the button 122 is to commence a document scan operation in accordance with the scan control information associated with the scan-placeholder, to redeem the placeholder. The legend 124 is therefore displayed as "Scan". Referring again to FIG. 12, when a user selects a scan-placeholder object 90 for redemption, a first processing step 130 is to retrieve the control information (FIG. 13) to set-up the internal parameters of the multifunctional document processor 22 for the expected document. In the present example, the control information is stored as metadata associated with the placeholder object 90, and so is retrieved from the placeholder object.

At step 132, the scan operation is carried out to capture a digital image of the paper document, in accordance with the scan control information 96 (FIG. 13). The scanned image is also processed in accordance with any post-scanning control information 98 (FIG. 13). This is shown as part of the same method step 132, although it will be appreciated that such post-scanning processing may be carried out either at the multifunctional document processor 22 or by a processor within the document repository 10.

At step 134, the digital file is uploaded to the document repository 10 for storage in a target location and/or under the filename 100 specified by the scan-placeholder object 90. If any distribution or notification information 102 is also specified, then copies are forwarded, or notifications sent, to the designated recipients.

At step 136, a decision is made as to whether to delete the scan-placeholder object 90, on the basis of the delete flag 104. In the present example, in which the scan-placeholder object 90 represents a single expected paper document, then it should be deleted once it is redeemed. However, there are situations in which the scan-placeholder object should be retained, as explained later below.

In the above example, the scan control information is stored as part of the metadata of the scan-placeholder object 90. However, in other forms, some or all of the scan control information may be stored elsewhere in the document repository system 10, or in the local terminal 18 or scanning device of multifunctional document processor 22. In such a case, the scan-placeholder object 90 may then contain metadata for "pointing" to the respective scan control data.

In one form, the scanning device of multifunctional document processor 22 may accommodate scan templates, which are sets of control parameters which can be stored locally on the scanning device of multifunctional document processor 22, or in one or more shared pools accessible via the network 16. If desired, selecting a scan-placeholder object 90 in a graphical screen on, for example, one of the computer terminals 18 can generate a local template on a scanner device of multifunctional document processor 22 for the scan job. The template can include at least some of the information shown in FIG. 13, or it can include a placeholder identifier so that the scanned image can be matched to the placeholder object 90 which created the template when the image file is uploaded to the document repository 10. On the scanner device of multifunctional document processor 22, the scan template may be selected using a display similar to that of FIG. 14.

A.4 Accessing Scan-Placeholder Objects Using Coversheets

In the above example, the user is required to select a scan-placeholder to be redeemed, which then triggers the scanning and uploading process (or at least triggers the creation of a template for that scanning job, which subsequently has to be selected again by the user at the scanning device of multifunctional document processor 22).

Figure 17:
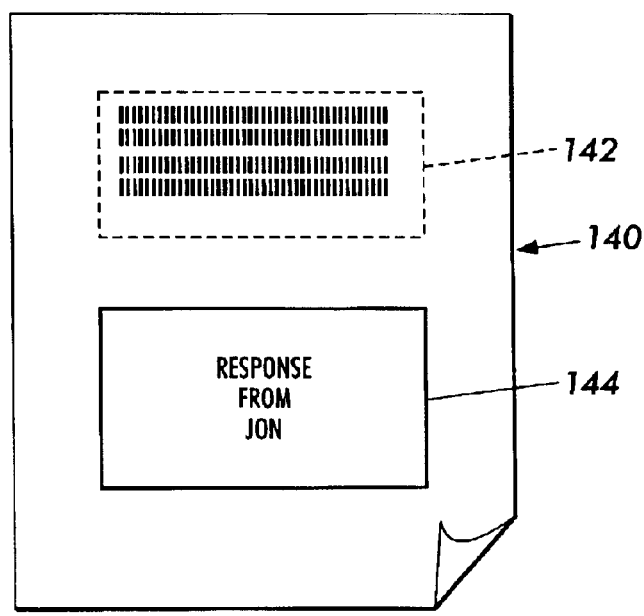
FIG. 17 is a schematic representation of a first example of a scan cover sheet.

In the present example, an alternative technique is to use a machine readable cover sheet 140 as a way of inputting information without having to make an on-screen selection of a scan-placeholder object at the time of the scan, as illustrated in FIG. 17. This may be especially useful when a large number of different scan-placeholders exist for different expected documents, and an on-screen selection might be time consuming.

The cover sheet 140 includes information about the document being scanned, and may typically be printed when the scan-placeholder object is created. This could be performed automatically/programmatically, such as when the original letter for which the reply is expected is sent off. The cover sheet 140 includes a machine-readable portion 142 containing, for example, bar-code or glyph data, and a user readable portion 144 with legible text. For example, the legible portion may say "Response from Jon", and the machine readable portion may contain a unique identifier code identifying the corresponding scan-placeholder object in the file management system 14. The cover sheet 140 could also be printed at any time as one of the commands that a user can select from the scan-placeholder object 90.

Once the cover sheet has been read and decoded, processing would start at a step 146 (FIG. 12) to locate the scan-placeholder object matching the cover sheet 140. The processing could then continue to steps 130 through 136 described previously.

In a modified form, the machine readable portion 142 might also contain some or all of the scan control information (FIG. 13) for controlling the scanning of the document. This could enable the scan control information to be read and decoded directly from the paper document at scan time, instead of having to be retrieved from the document management system 14 or from another memory location.

Figure 18:
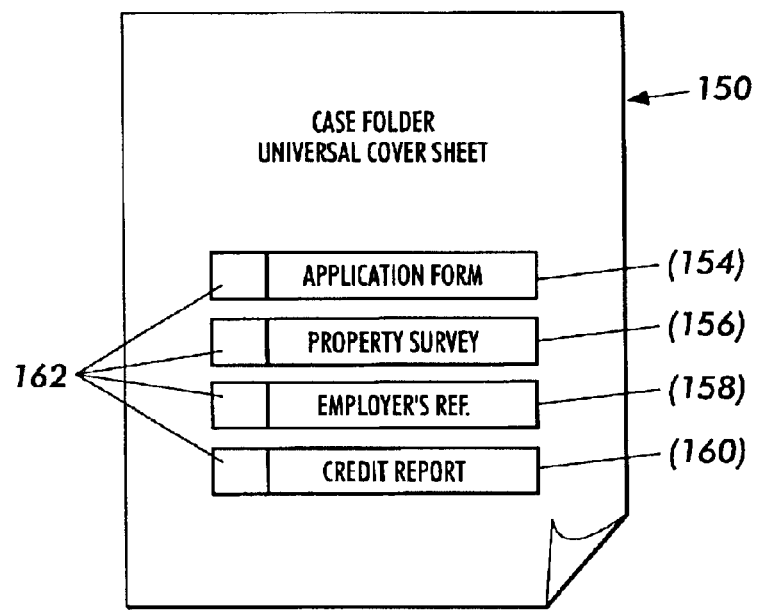
FIG. 18 is a schematic representation of a second example of a scan cover sheet.

FIG. 18 illustrates an alternative form of cover sheet 150 which may provide advantages in enabling a matching scan-placeholder object to be identified. Instead of generating a dedicated cover sheet for each scan-placeholder, a universal cover sheet may be printed listing all (or a selection) of the currently available scan-placeholders. This may be generated (printed) at any time using a universal command. The cover sheet 150 may, for example, be limited only to the scan-placeholder objects in a selected folder.

Figure 19:
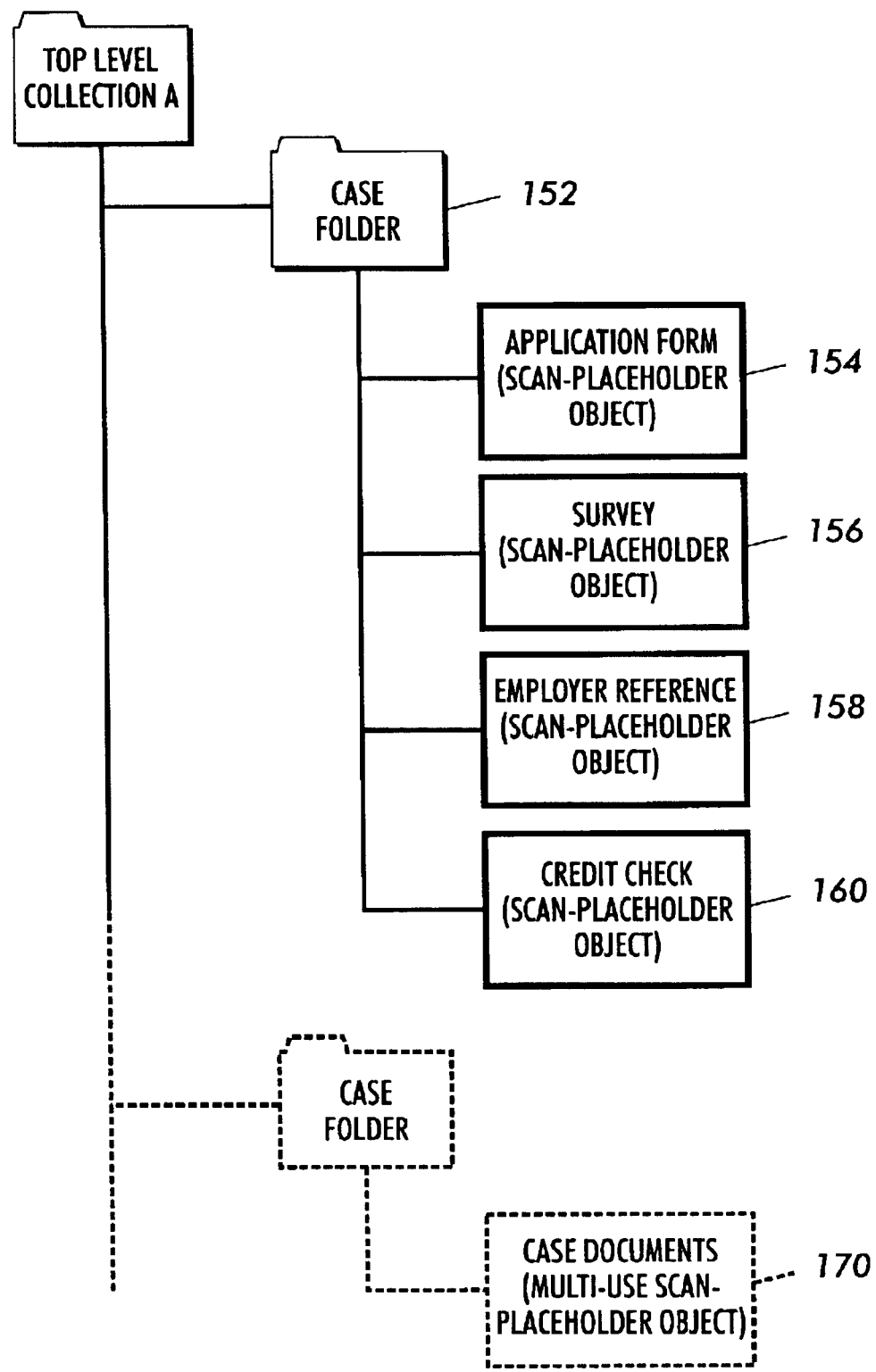
FIG. 19 is a schematic representation of the hierarchical filing structure for processing a mortgage application.

Referring to FIG. 19, in the case of a system for processing mortgage applications, a hierarchical folder 152 called "Case Folder" may be set up including scan-placeholder objects 154–160 for the expected (required) paper documents to support the mortgage application. In this example, the documents are a mortgage application form (scan-placeholder 154), a written property survey (scan-placeholder 156), an employer reference (scan-placeholder 158), and a credit check (scan-placeholder 160).

In order to input a paper document into the document repository, a universal cover sheet 150 is printed listed all of the outstanding (pending) scan-placeholder objects 154, 156, 158, and 160 in the folder 152. The cover sheet includes a user-markable box 162 next to each item in the list, to enable the user to place a mark (e.g. a tick or a cross) to represent which document is to be scanned. When the cover sheet 150 is scanned by the scanner unit of multifunctional document processor 22, the scanner is able to decode the marked cover sheet to determine which scan-placeholder represents the document to be scanned (step 164 in FIG. 12). The process then proceeds to steps 130 through 136 as described previously.

A.5 Multi-Use Placeholder Objects

In the preceding examples, each placeholder object represents a single expected document file. However, there are situations, particularly for scanning paper documents, where it is more convenient to represent plural expected documents by a single "generic" placeholder object.

In the present example, a generic scan-placeholder object consists of similar information (FIG. 13) to a single-document placeholder. However, the "delete-after-use" flag 104 is set to negative, such that the placeholder object is not deleted when it is redeemed by scanning a document. Instead, the placeholder object remains in place to enable future documents to be scanned in "through" the same placeholder object.

A further difference is the nature of the storage/filename information 100. In the case of a single-document placeholder, the filename may be a specific filename for the specific file. However, for a plural-use scan-placeholder, the storage/filename information 100 should preferably specify a file-naming rule. Such a rule may be a combination of alphabetic and numeric components, such that the alphabetic portion remains the same for each file, and the numeric part is incremented for each redeem operation, to provide a sequence of filenames. Alternatively, filenames could be generated using the names already in the folder/location where the document is to be stored. Again, a simple mechanism is to parse the names already there into alphabetic and numeric components, and increment the numeric for each new document. More sophisticated mechanism include identifying other patterns such as dates or times that are a component of filenames, or parsing existing filenames and using the results to select information from the scanned document to create the filename.

As an example of a multi-use placeholder, the specific scan-placeholder objects 154, 156, 158, and 160 of FIG. 19 could be replaced by a multi-use placeholder object 170 (shown in phantom in FIG. 19). In use, when each document is scanned in by redeeming the placeholder 170 multiple times, the documents will be given sequential filenames corresponding to the order in which they are scanned into the system.

The multi-use placeholder 170 could remain in place indefinitely (i.e., until removed manually or by a separate application program). Alternatively, the multi-use placeholder 170 could be set to delete once it has been redeemed a certain number of times (corresponding to the expected number of paper documents), or once a certain final document is recognized as having been received.

B. Alternate Operating Environments

The above examples have been described in the context of a network based document processing system, in which the filing system objects (document file objects 28 and placeholder objects 30, 90 and 170) are organized by a file management system 14 which is accessed by remote users over a network.

Figure 20:
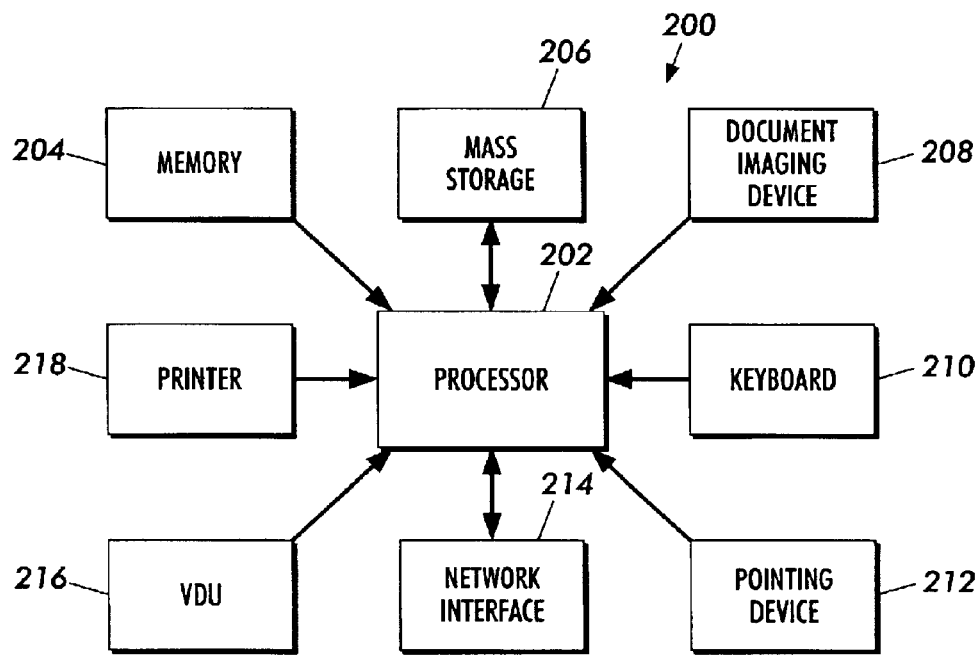
FIG. 20 is a schematic block diagram of the functional relationship between components of a second embodiment of computer system.

FIG. 20 illustrates the functional components of a second embodiment of a local computer system 200, which may be an independent system, or one of the terminals 18 shown in the first embodiment of FIG. 1.

Referring to FIG. 20, the system 200 generally comprises a computer processor 202, memory (e.g. RAM) 204, a mass storage device (e.g. a disc device such as an optical or magnetic disc) 206, a document imaging (or input) device (such as a digital camera or an optical scanner) 208, a user keyboard 210, a user pointing device (such as a mouse, or joystick, or tracker-ball) 212, a communication interface 214 (for example a connection to a network), and a visual display unit (VDU) 216 (such as an LCD screen, or a cathode ray tube or other field-emission device). The system 200 may also include a printer 218 for printing documents. Although these elements are shown schematically as being connected separately to the processor 202, it will be appreciated by those skilled in the art that elements may be connected by one or more shared buses (as is conventional in the art).

Figure 21:
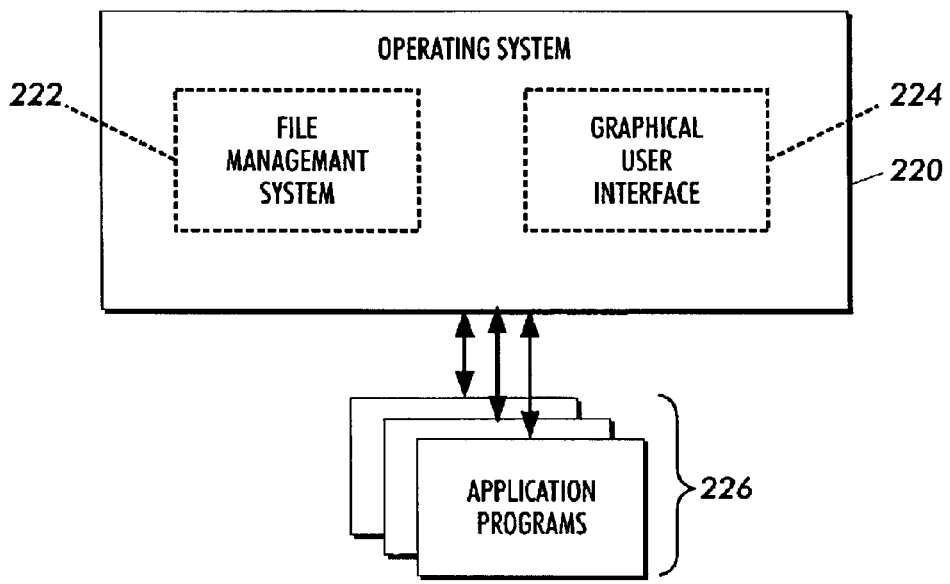
FIG. 21 is a schematic diagram showing the relationship between a computer operating system and application programs.

Referring to FIG. 21, the system 200 generally includes, or runs, an operating system 220 which includes a file management system 222 (also referred to herein as the filing system 222), and a graphical user interface (GUI) 224. One such suitable operating system is, for example, Windows produced by Microsoft® Corporation. Application programs 226 are run on the system 200 under the control of the operating system 220. Such programs may include, for example, one or more placeholder elements 2, a document processing application for storing document images, a scanning application for capturing document images using the document imaging device 208, an optical character recognition application for converting a document image into electronic text, and a word processing application.

Figure 22:
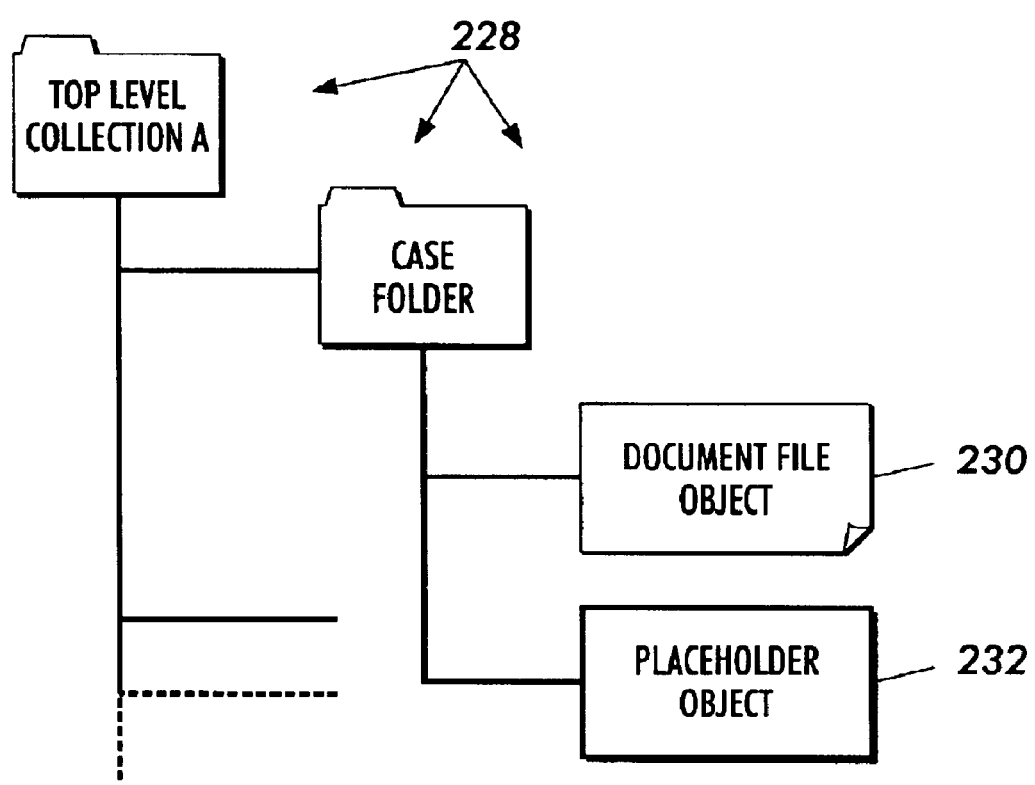
FIG. 22 is a schematic diagram showing the hierarchical filing structure of the second embodiment.

Referring to FIG. 22, in this example the file management system 222 organizes files as objects 228 within a hierarchical structure. The objects 228 can include various file types including a document file type 230. Under the Windows operating system, the file type is identified by a three-letter extension of the filename. The invention is not limited to hierarchical file management systems; as mentioned previously, other file management systems may use attributes or identifiers to organize filing system objects.

As described thus far, the system is largely conventional, and will be familiar to those skilled in the art. Therefore, the conventional aspects do not need to be described in further detail.

In the same manner as the first embodiment, the current embodiment also accommodates placeholder objects 232 for providing an explicit representation of files which are not recognized as being present, but which are explicitly expected in the future. A placeholder object 232 (actually a file) may be designated by a different filename extension, which the file management system 222 recognizes as being an explicit representation of a file, or state, which is explicitly expected in the future. As in the first embodiment, the system may provide for placeholders of different types, to represent different types of expected files (such as different types of document files), and/or to represent different placeholder categories with differing functionalities.

In particular, the placeholder objects 232 can include a file-placeholder object, a scan-placeholder object, and a multi-use placeholder object (such as a multi-scan-placeholder object), in exactly the same manner as the first embodiment.

In addition to the technical advantages of the first embodiment, the second embodiment also provides the additional features of the GUI for processing filing system objects 228. Each object can provide a "focus" in the GUI for operations concerning the object 228. For example, where the object is a document file 230, a user may open the file simply by "clicking" a pointer or cursor on the object in a visual display. Additionally, or alternatively, it is conventional to provide sub-menus (or contextual menus) associated with each object which can be displayed by "clicking" a pointer or cursor on the object in the GUI 224. The same applies to placeholder objects 232, which can provide a focus for operations concerning the placeholder. In particular, "clicking" on a placeholder object may initiate a default operation such as a default redeem operation. For example, if the placeholder object is a file-placeholder, then "clicking" on the placeholder may open a browser window for the user to select a file to redeem the placeholder. Alternatively, if the placeholder object is a scan-placeholder, then "clicking" on the placeholder may initiate a scan operation to redeem the placeholder.

A sub-menu may also be provided for the placeholder in which at least one of the commands is to redeem the placeholder using the expected file. Additionally, or alternatively, the placeholder object 232 may be redeemable by "dragging and dropping" a file onto the placeholder 232 using the conventional so-called "drag and drop" facility of the GUI 224.

Other options in the sub-menu may provide information from the metadata of the placeholder object, such as when the document is expected, how the expected document relates to other documents, and details of previous versions if the placeholder is a version placeholder.

The manner in which placeholder objects are represented and processed is analogous to that in the first embodiment. Therefore, the technical description need not be repeated. Instead, the following examples focus on various differences of using the GUI 224.

B.1 Drag-and-Drop Example

Figure 23:
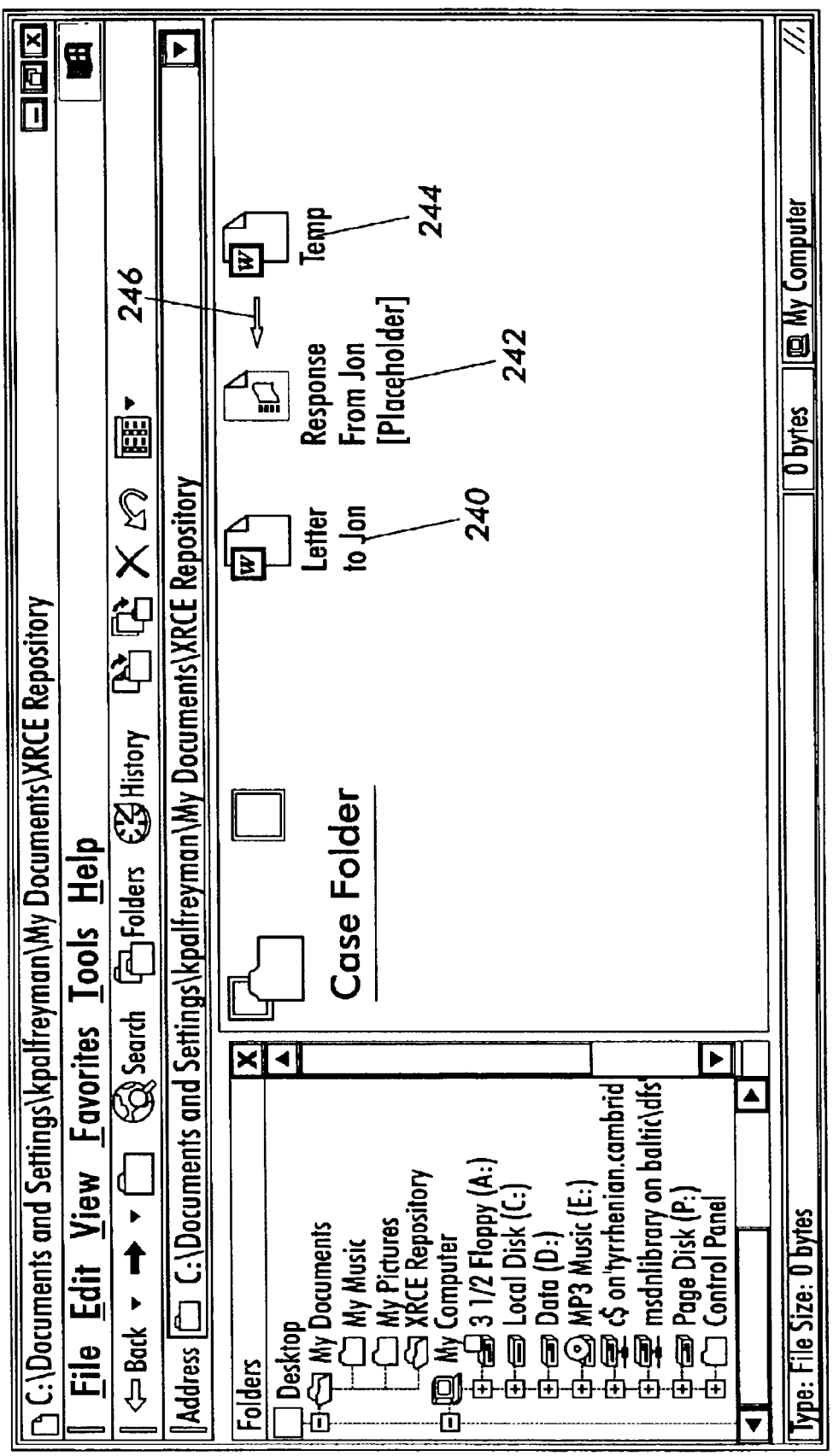
FIG. 23 is a schematic representation of a first GUI (Graphical User Interface) display.

FIG. 23 shows an example of a typical GUI display of a hierarchical folder called "Case Folder", and containing (in a similar manner to FIG. 2), a first document file object 240 called "Letter to Jon", a placeholder object 242 called "Response from Jon", and also an additional document file object 244 called "Temp".

In this example, it is assumed that the file "Temp" is a newly arrived document file representing the reply from Jon. In order to redeem the placeholder object 242 with the document file, it is necessary simply to perform a "drag and drop" operation in the GUI, to drag the document object "Temp" 244 on to the placeholder object 242. In FIG. 23, the "drag and drop" operation is shown schematically by the arrow 246.

B.2 Menu Example

The above example assumes that the expected file is in the same GUI window as the placeholder, or that it is in a simultaneously displayable GUI window, so that a "drag and drop" operation can be performed.

As indicated above, if the placeholder object indicates the source of the expected document, then an alternative to the "drag and drop" technique is simply to "click" on the placeholder icon, to initiate the default redeem operation.

Figure 24:
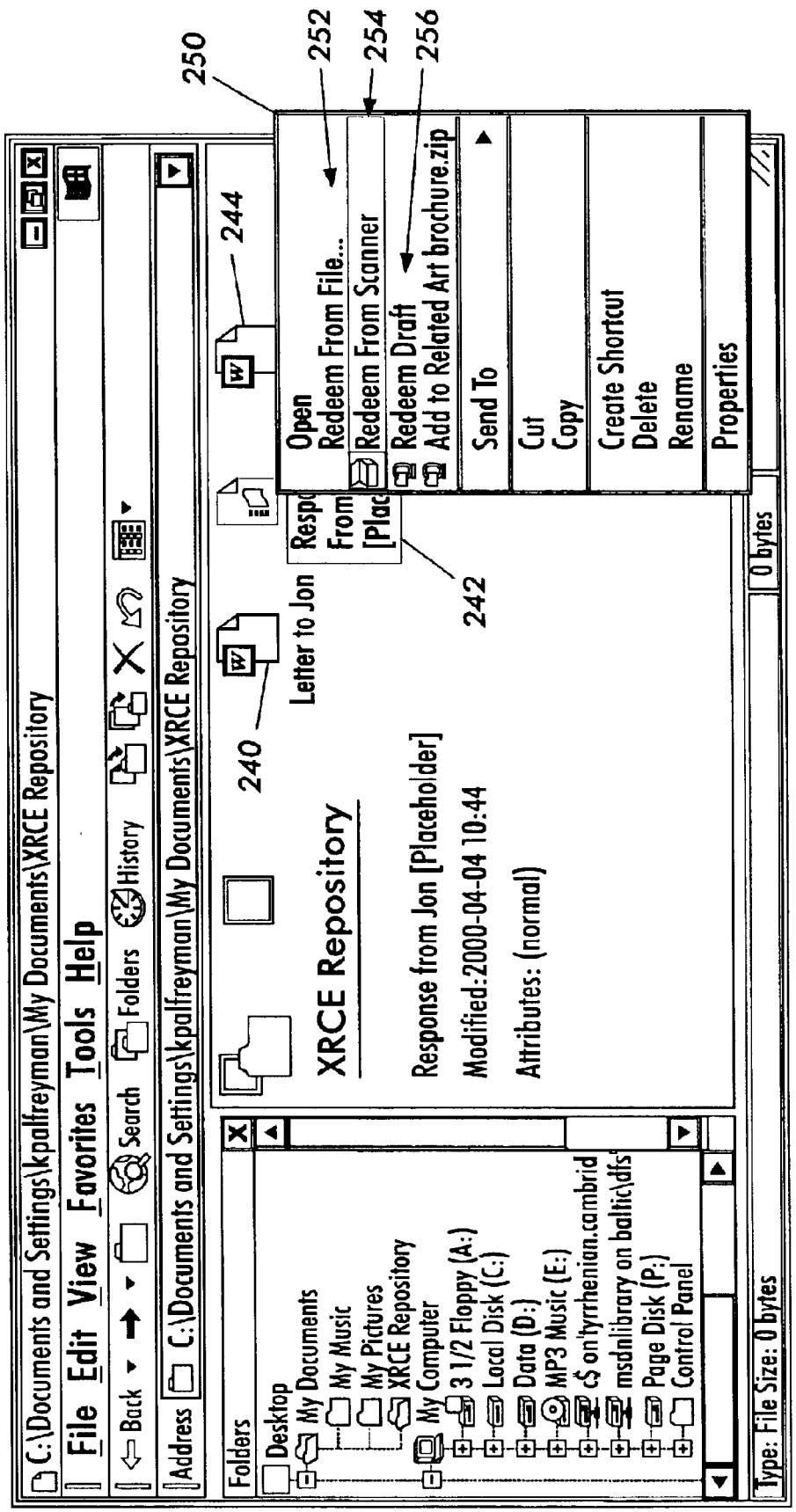
FIG. 24 is a schematic representation of a second GUI display including a contextual menu.

Referring to FIG. 24, an alternative technique is to display a contextual menu 250 associated with an object, here the placeholder object 242 called "Response from Jon". The contextual menu 250 includes a first redeem command 252 to redeem the placeholder object 242 from an existing file (in an analogous manner to that described in Section A.1 above); this command launches a file lister/browser for the user to select the file from a list of available files.

The contextual menu also includes a second redeem command 254 to redeem the placeholder object 242 by scanning the document directly using the optical imaging device 208. If the placeholder object 242 is a scan-placeholder, then this redeem command 254 will be the default redeem command in the contextual menu 250, and the placeholder object 242 will also provide a reference to the required scan control information for the optical imaging device 208 (in an analogous manner to that described in Section A.3 above).

The contextual menu also includes a third redeem command 256 to redeem a draft version of the expected document file against the placeholder (in an analogous manner to that described in Section A.2 above).

It will be appreciated that the contextual menu can be tailored to the type of placeholder object, and that the user might not normally be presented with all options, only those that are relevant to the type of placeholder. If the placeholder does not indicate the source of the expected document, then the user can be presented with the choices in the contextual menu.

C. Placeholders in Messaging and Workflow Systems

The above embodiments and examples relate generally to document files stored in a document repository system, or on a user's computer. However, the concept of placeholder objects can be extended to any file handling system for which it might be useful to provide an explicit representation of files which are explicitly expected in the future.

One such system is an email or other messaging system and/or a task or workflow handling system. The apparatus and application software for setting up such a system are well known to those skilled in the art, and so will not be described here in detail. The present description will focus on the use of placeholders in such a system.

Figure 25:
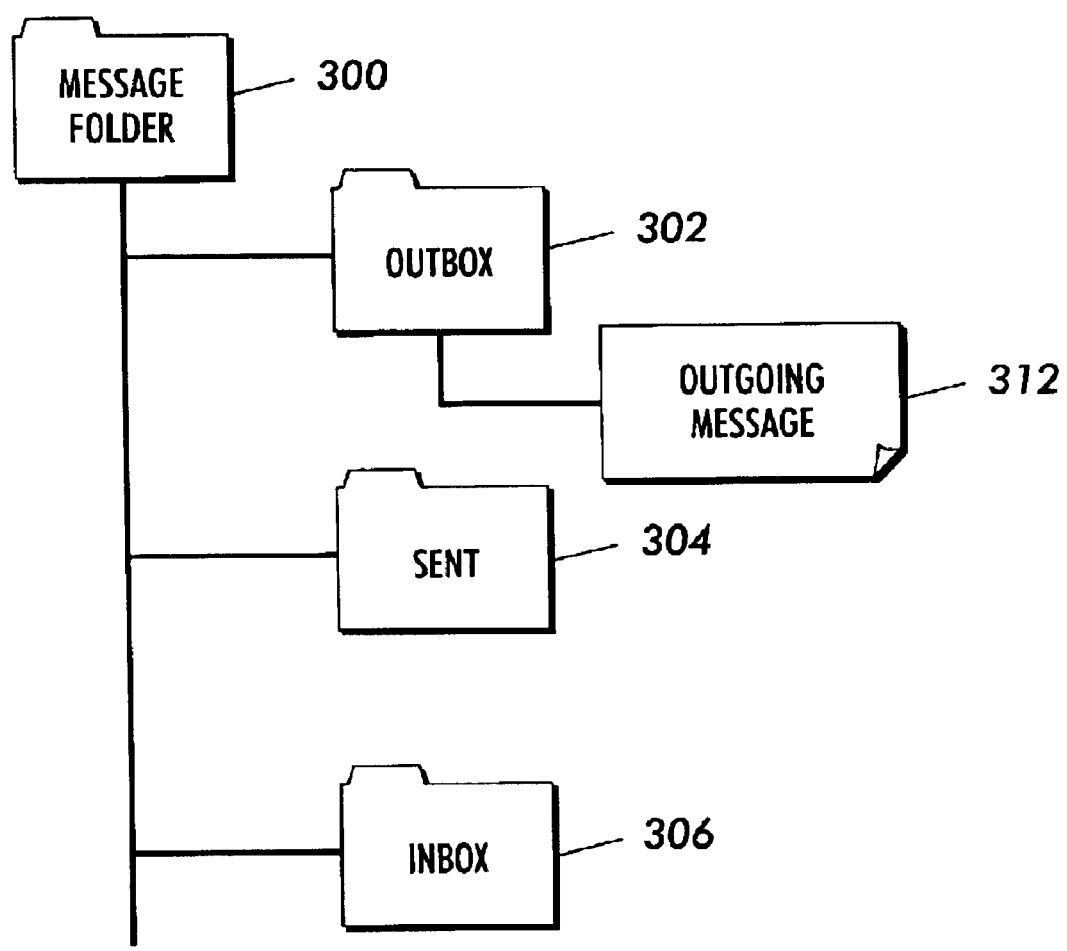
FIGS. 25 and 26 are schematic representations of a hierarchical filing structure of a third embodiment.
Figure 26:
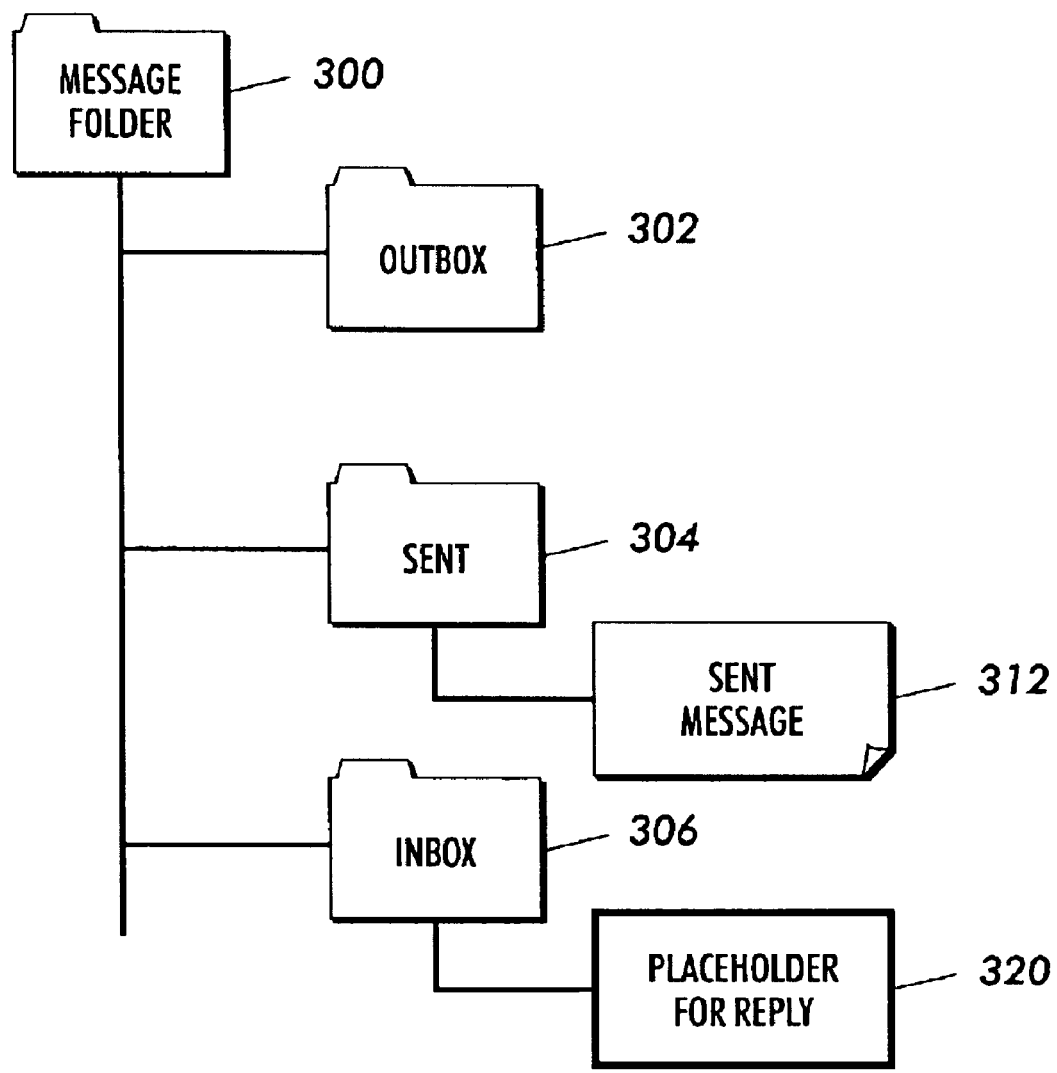

FIGS. 25 and 26 show an example hierarchical filing system for a email or other messaging system, it being appreciated that such a system is merely an example of a file management system for the purposes of this invention. The structure includes a hierarchical messages folder 300 for containing all of the messages or work tasks. The folder 300 contains a number of sub-folders, including an outbox folder 302, a sent folder 304, and an inbox folder 306. Typically, messages which have been prepared for sending are stored in the outbox folder 302, until they are sent whereupon they are transferred to the sent folder 304. Incoming messages are stored in the inbox folder 306.

Figure 27:
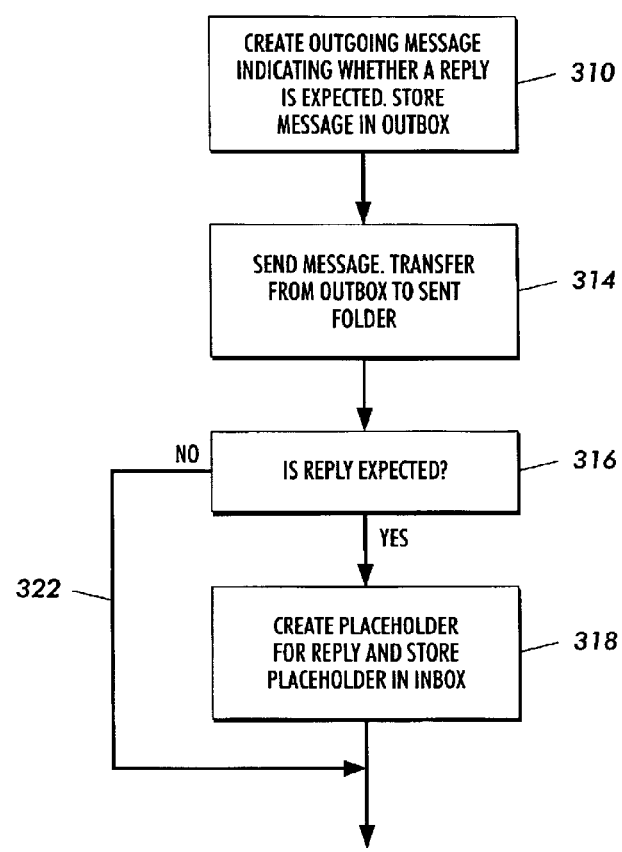
FIG. 27 is a schematic flow diagram illustrating the processing steps for sending a message.

FIG. 27 shows an example of the processing steps for using placeholder objects in such a system. At step 310, an outgoing message 312 is prepared, and is stored in the outbox folder 302 (see FIG. 25). A flag or other indicator is set in the message to indicate whether a reply is expected. A due date for the reply may also be indicated in the message in a standard field of the message.

The message 312 remains in the outbox folder 302 until it is sent out at step 314. At that time, the message 312 is moved from the outbox folder 302 to the sent folder 304 (FIG. 26).

At step 316, a test is performed to determine whether the message indicated that a reply was expected. If yes, then the process proceeds to step 318 at which a placeholder object for the expected reply is created, and is stored in any suitable folder, for example in the inbox folder 306 (FIG. 26). The placeholder object includes information such as one or more of the due date by which the reply is expected, the title of the outgoing message, the name of the original addressee (from whom the reply is now expected), and/or a unique identifier code which acts as a label for enabling a reply to be recognized automatically.

In this example, by creating a placeholder object 320 in the inbox folder 306, the user will be given a explicit indication that there is an outstanding reply expected, each time the user views the inbox. In some cases, the inbox folder 306 might be the folder which a user will display most often, and might even be the only folder which a user will view regularly. Therefore, the presence of a placeholder object 320 provides a constant reminder that the user is still expecting a reply. In other examples, the placeholder object 320 could be placed in different folders, for example, a dedicated folder for placeholders, or in folders organized by work type, expected document type, or by name (e.g. client or addressee name).

If at step 316 it is determined that no reply is expected, then the process branches along path 322 to bypass the creation of any placeholder 320.

Figure 28:
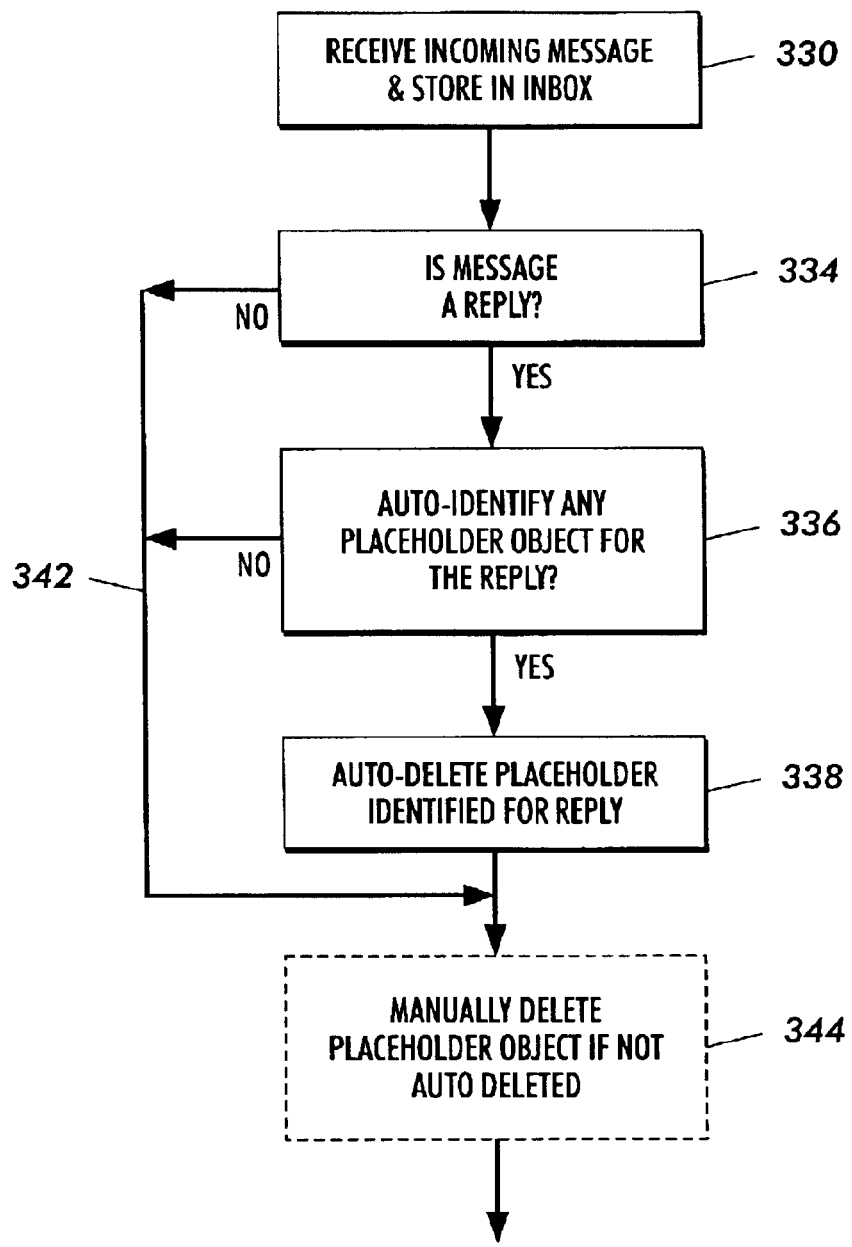
FIG. 28 is a schematic flow diagram illustrating the processing steps for receiving a message.
Figure 29:
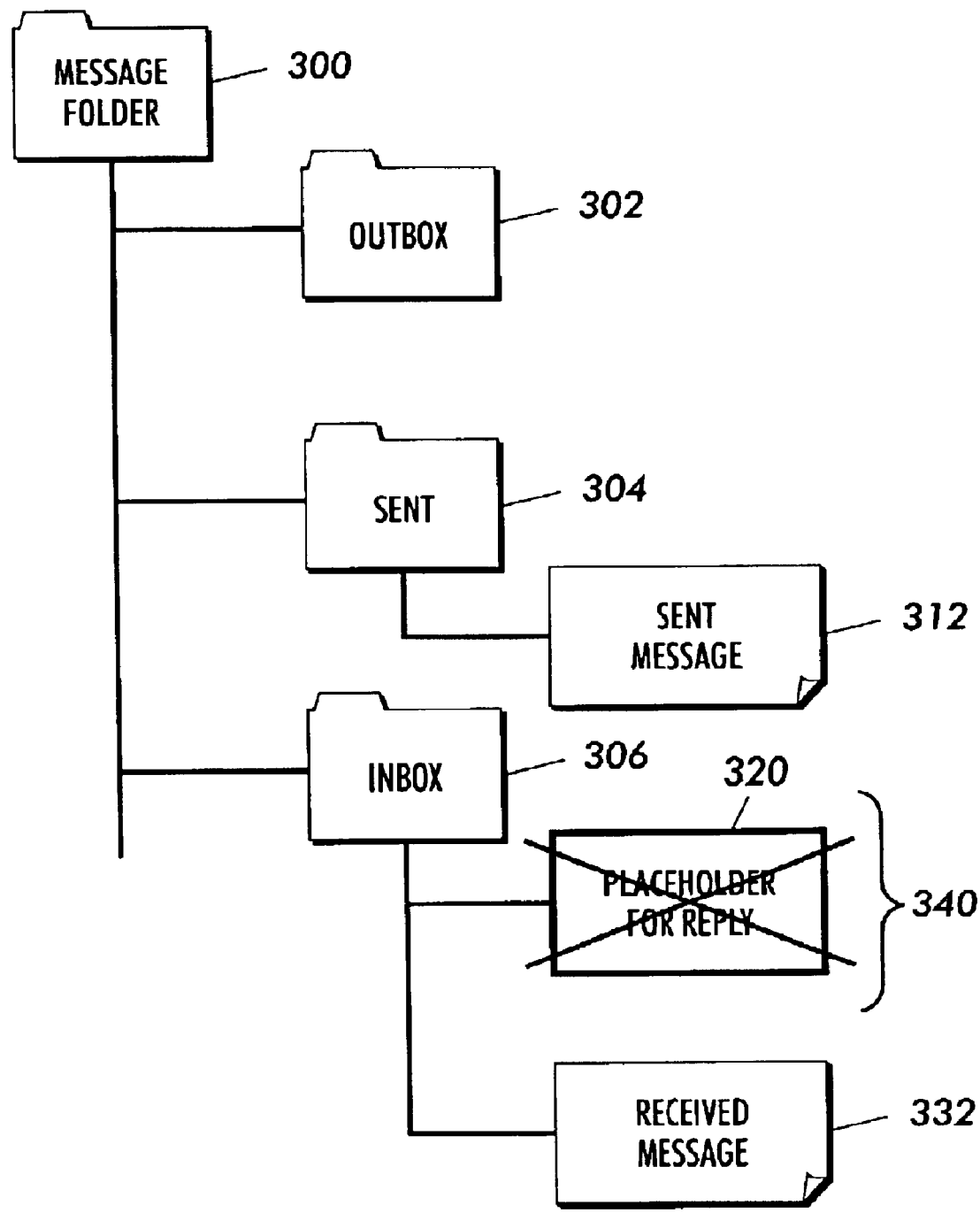
FIG. 29 is a schematic representation of the filing structure after a placeholder has been redeemed by a reply message.

FIG. 28 shows the processing steps required to check whether an incoming message needs to be redeemed as a reply against a placeholder. Firstly, at step 330, the received message 332 is stored in the inbox folder 306 (FIG. 29). At step 334, a first test is performed to determine whether the received message is in the form of a reply. Such a reply often has a title beginning with the characters "Re: . . . ", or containing the word "Reply". Additionally, a reply message often contains the entire text of the original message.

If at step 334 it is determined that the received message is in the form of a reply, then the process proceeds to step 336 at which a determination is made to try to identify whether the message matches any existing reply placeholder 320. For example, such matching can be indicated by matching one or more of the title of the outgoing message, the name of the original addressee (from whom the reply is now expected), and/or a unique identifier code contained in the original message and in the reply.

If at step 336 a placeholder 320 (FIG. 29) is identified, then the process proceeds to step 338 at which the placeholder 320 is deleted from the inbox folder 306 (indicated by crossed lines 340). Thus the placeholder 320 can be removed automatically, to avoid any false alerts to the user that a reply is still expected.

If at step 334 it is determined that the received message is not a reply, or if at step 336 it is not possible to identify a matching placeholder 320, then the process branches along path 342 to bypass the placeholder deletion step 338.

It is, of course, possible that a person may send a reply in the form of a new message (rather than a reply derived from the data in the original message), and the automatic processing steps 334, 336, and 338 might then not recognize such a new message. In that case, it will be necessary for the user to manually delete the placeholder object 320 using a manual delete operation 344. Such a manual delete operation is the same as the delete feature normally provided in an email system for enabling a user to delete any selected files from the message folders 302, 304, or 306.

FIG. 31 illustrates an example of a user interface for implementing messaging and placeholders within a workflow system in the form of a mortgage application system. FIGS. 31*a*–*d* represent different steps in the sequence for the user.

In FIG. 31*a*, a first step is for the user to select a client folder 370 from a list 372 of pending folders.

In FIG. 31*b*, the user is presented with a display window based on the information in the folder 370. The display window includes a sub-window 374 entitled "Required Documents for Smith Gareth", and listing various documents indicated as being required. In the sub-window 374, placeholder objects 376 indicate that the documents are explicitly expected, and have not yet arrived.

The sub-window 374 also includes a "clickable" button icon 378 labeled "Send eMail to client", for creating an email message to send to the client about a required document. Clicking on the button 378 opens an email message window 380 (FIG. 31*c*). The addressee "To" field 382 is completed automatically from the workflow system, and the "Subject" field 384 and the text "Body" field 386 can be completed by the user, to request a document from the client.

Upon clicking the "Send" button 388, the email message is sent to the client. Also, importantly, a new placeholder object 390 is created for a new required document (FIG. 31*d*). The title for the new placeholder object 390 is based on the "Subject" field 384 of the email message, and the metadata for the placeholder object 390 includes a link to the sent email message to provide a history of the requested document. The placeholder object 390 can be redeemed or satisfied using any of the methods described above.

The above example has been simplified to focus on the use of placeholder objects, and their generation. It will be appreciated that additional information could be provided for the placeholder object, for example, a date by which the requested document is expected, and notification details for notifying a user when the expected document arrives (or for notifying a user if the document has not arrived by the expected date).

D. Miscellaneous

In all of the above embodiments and examples, the document files and placeholder objects are described as objects recognizable by the file management system, so that the placeholder objects can be processed in the same manner as any other file object using the GUI of the operating system.

However if a placeholder is not a filing system object, then it is desirable that the placeholder be displayed as a graphical object in an object-orientated graphics display. It will therefore be appreciated that in other embodiments a placeholder might not be a distinct filing system object, but instead might be a graphical depiction of data that may be processed by a specific application program, presenting the user with a graphical depiction of an expected file. Notwithstanding this alternate form, the placeholder provides an explicit representation of an expected file (or an expected future state).

As an example, it is possible that a messaging system might maintain all of the messages in a single large file, together with an index, and scheduling data for scheduling when replies are expected. In such a case, the system could still generate a graphical depiction of a placeholder object based on the scheduling data of tasks or expected replies to messages, even though this object might not exist as a logical element in the file structure. The user is then still presented with a graphical depiction as if the placeholder object were a real object. Such a placeholder may be termed a virtual placeholder object.

Also, as mentioned previously, the file management system need not be hierarchical in nature. The filing system objects can alternatively be organized according to any suitable technique, for example, by object attributes or by identifier used for object organization.

The Placeless filing systems is an example of an alternative filing system. The Placeless filing system is described in the following U.S. Pat. Nos. 5,930,801, 6,266,682, 6,308,179, 6,324,551, 6,266,670, 6,240,429, 6,269,380, 6,253,217, and in European Patent Application EP 0986009, which are incorporated herein by reference.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. An electronic document processing system for processing electronic representations of documents, comprising:

an electronic filing system for managing filing system objects; the filing system objects managed by the electronic filing system including an electronic document file class of filing system object that is associated with an electronic document file;

a placeholder object generator for generating a placeholder class of filing system objects in the electronic filing system that are distinct from the electronic document file class of filing system objects; each placeholder object generated by the placeholder generator (a) being stored in the electronic filing system with metadata that identifies an expected document file that is to be created in the electronic filing system and (b) representing the expected document file which is not recognized as being present in the electronic filing system but which is explicitly expected to be stored in the electronic filing system; and a placeholder controller for performing a redeem operation to redeem a placeholder object when the expected document file is presented; the expected document file being recognized as being present in the electronic filing system after the placeholder controller redeems the placeholder object.

2. An electronic document processing system according to claim 1, wherein the placeholder controller deletes the placeholder object when the corresponding expected document file is created in the electronic filing system.

3. An electronic document processing system according to claim 1, a version-data generator for generating version-data associated with the placeholder object for permitting a plurality of versions of the expected document file to be associated with the placeholder object;

wherein the placeholder controller redeems the placeholder object with a version of the expected document file when the version of the expected document file is presented.

4. An electronic document processing system according to claim 3, wherein the placeholder controller is operative to change the version-data associated with the placeholder object in the electronic filing system without deleting the placeholder object in response to receiving the version of the expected document.

5. An electronic document processing system according to claim 4, wherein the placeholder controller is operative to delete the placeholder object in the electronic filing system when a final version of the corresponding expected document file is created in the electronic filing system.

6. An electronic document processing system according to claim 3, the placeholder controller is operative to generate a new placeholder object representing a future expected version of the expected document, in response to the version of the expected document being presented.

7. An electronic document processing system according to claim 1, wherein the placeholder object includes metadata associated with the expected document file.

8. An electronic document processing system according to claim 7, wherein the metadata includes information associated with a source of the expected file document.

9. An electronic document processing system according to claim 7, wherein the metadata includes information associated with an input device for receiving the expected file document into the electronic document processing system.

10. An electronic document processing system according to claim 7, wherein the metadata includes information associated with a target location in the electronic filing system for storing the expected document file when it is presented.

11. An electronic document processing system according to claim 1, further comprising a display for displaying a graphical user interface representing objects within the electronic filing system, the graphical user interface distinguishing between document file objects and placeholder objects.

12. An electronic document processing system according to claim 11, further comprising:

an input device for enabling a user to select an object having a menu of available commands associated with the object;

wherein the menu of available commands associated with a placeholder object includes at least one redeem command for redeeming the placeholder object with the expected document file.

13. An electronic document processing system according to claim 11, wherein the placeholder controller is responsive to a drag-and-drop file command received from the graphical user interface for redeeming the placeholder with a drag-and-dropped file.

14. An electronic document processing system according to claim 1, wherein the object generator and placeholder controller form part of a messaging system for sending and receiving electronic messages; and wherein the filing system objects comprise electronic messages stored in the messaging system, and the placeholder objects comprise electronic messages which are not currently recognized as being present in the messaging system but which are explicitly expected.

15. An electronic document processing system according to claim 14, wherein the messaging system manages the sending and receiving of electronic messages in a workflow system.

16. An electronic document processing system according to claim 1, wherein the placeholder controller monitors whether the expected document file is presented within a predetermined time limit; and wherein the placeholder controller generates an output message if the expected information is not presented within the predetermined time limit.

17. A method for processing electronic representations of documents, comprising:

managing filing system objects in an electronic filing system; the filing system objects managed by the electronic filing system including an electronic document file class of filing system object that is associated with an electronic document file;

generating a placeholder class of filing system objects in the electronic filing system that are distinct from the electronic document file class of filing system objects; each placeholder object generated by the placeholder generator (a) being stored in the electronic filing system with metadata that identifies an expected document file that is to be created in the electronic filing system and (b) representing the expected document file which is not recognized as being present in the electronic filing system but which is explicitly expected to be stored in the electronic filing system; and performing a redeem operation to redeem a placeholder object when the expected document file is presented; the expected document file being recognized as being present in the electronic filing system after the placeholder controller redeems the placeholder object.

18. A method according to claim 17, wherein the placeholder object is deleted in the electronic filing system when the corresponding expected document file is redeemed in the electronic filing system.

19. An electronic document processing system for processing electronic representations of documents, comprising:

means for managing filing system objects in an electronic filing system; the filing system objects managed by the electronic filing system including an electronic document file class of filing system object that is associated with an electronic document file;

means for generating a placeholder class of filing system objects in the electronic filing system that are distinct from the electronic document file class of filing system objects; each placeholder object generated by the placeholder generator (a) being stored in the electronic filing system with metadata that identifies an expected document file that is to be created in the electronic filing system and (b) representing the expected document file which is not recognized as being present in the electronic filing system but which is explicitly expected to be stored in the electronic filing system; and means for performing a redeem operation to redeem a placeholder object when the expected document file is presented; the expected document file being recognized as being present in the electronic filing system after the placeholder controller redeems the placeholder object.

20. The electronic document processing system according to claim 19, wherein the placeholder object is deleted in the electronic filing system when the corresponding expected document file is redeemed in the electronic filing system.

* * * * *